(12) United States Patent
Xu et al.

(10) Patent No.: US 11,822,190 B2
(45) Date of Patent: Nov. 21, 2023

(54) SPATIAL LIGHT MODULATOR AND METHOD OF FORMING THE SAME

(71) Applicant: Agency for Science, Technology and Research, Singapore (SG)

(72) Inventors: Xuewu Xu, Singapore (SG); Ramon Jose Paniagua Dominguez, Singapore (SG); Arseniy Kuznetsov, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 66 days.

(21) Appl. No.: 17/622,324

(22) PCT Filed: Jun. 24, 2019

(86) PCT No.: PCT/SG2019/050313
§ 371 (c)(1),
(2) Date: Dec. 23, 2021

(87) PCT Pub. No.: WO2020/263174
PCT Pub. Date: Dec. 30, 2020

(65) Prior Publication Data
US 2022/0252945 A1 Aug. 11, 2022

(51) Int. Cl.
*G02F 1/1343* (2006.01)
(52) U.S. Cl.
CPC .... *G02F 1/134309* (2013.01); *G02F 2203/12* (2013.01)
(58) Field of Classification Search
None
See application file for complete search history.

(56) References Cited

U.S. PATENT DOCUMENTS

| 9,817,250 B2 | 11/2017 | Han et al. |
| 9,897,733 B2 | 2/2018 | Han et al. |

(Continued)

FOREIGN PATENT DOCUMENTS

| CN | 104049424 A | 9/2014 |
| EP | 3182200 A1 | 6/2017 |

(Continued)

OTHER PUBLICATIONS

International Search Report for International Application No. PCT/SG2019/050313 dated Sep. 9, 2019, pp. 1-4.

(Continued)

*Primary Examiner* — Ryan Crockett
(74) *Attorney, Agent, or Firm* — Shackelford, Bowen, McKinley & Norton, LLP

(57) ABSTRACT

Various embodiments may provide a spatial light modulator. The spatial light modulator may include a first electrode arrangement. The spatial light modulator may also include a second electrode arrangement. The spatial light modulator may additionally include a liquid crystal (LC) layer between the first electrode arrangement and the second electrode arrangement. The spatial light modulator may also include one or more nanoantennas in contact with the liquid crystal layer. The first electrode arrangement and the second electrode arrangement may be each configured to allow at least a portion of light to pass through.

20 Claims, 35 Drawing Sheets

(56) References Cited

U.S. PATENT DOCUMENTS

| | | | |
|---|---|---|---|
| 2012/0170097 A1* | 7/2012 | Han | B82Y 20/00 |
| | | | 977/932 |
| 2014/0176413 A1* | 6/2014 | Jung | G02F 1/133528 |
| | | | 349/96 |
| 2015/0331297 A1* | 11/2015 | Han | G03H 1/2294 |
| | | | 359/254 |
| 2017/0023803 A1* | 1/2017 | Han | G02F 1/015 |
| 2017/0176651 A1 | 6/2017 | Lee et al. | |
| 2018/0196137 A1* | 7/2018 | Lee | G01S 7/4817 |
| 2019/0049788 A1* | 2/2019 | Kuznetsov | G09G 3/36 |

FOREIGN PATENT DOCUMENTS

| | | |
|---|---|---|
| KR | 20170011945 A | 2/2017 |
| WO | 2017135890 A1 | 8/2017 |

OTHER PUBLICATIONS

Written Opinion of the International Searching Authority for International Application No. PCT/SG2019/050313 dated Sep. 9, 2019, pp. 1-6.

Li et al., "Phase-Only Transmissive Spatial Light Modulator Based on Tunable Dielectric Metasurface," https://arxiv.org/abs/1901.07742, Jan. 23, 2019, pp. 1-33.

Marquez et al., "Characterization of the Retardance of a Wave Plate to Increase the Robustness of Amplitude-Only and Phase-Only Modulations of a Liquid Crystal Display," Journal of Modern Optics, vol. 52, No. 4, Mar. 10, 2005, pp. 633-650.

Zhang et al., "Fundamentals of Phase-Only Liquid Crystal on Silicon (LCOS) Devices," Light: Science & Applications, vol. 3, e213, 2014, pp. 1-10.

Gao et al., "Monocular 3D See-Through Head-Mounted Display Via Complex Amplitude Modulation," vol. 24, No. 15, Jul. 25, 2016, Optics Express, 2017, pp. 17372-17383.

Turtaev et al., "Comparison of Nematic Liquid-Crystal and DMD Based Spatial Light Modulation in Complex Photonics," Optics Express, vol. 25, No. 24, 2017, pp. 29874-29884.

McManamon et al., "Optical Phased Array Technology," Proceedings of the IEEE, vol. 84, No. 2, 1996, pp. 268-298.

Hallstig et al., "Fringing Fields in a Liquid Crystal Spatial Light Modulator for Beam Steering," Journal of Modern Optics, May 20, 2004, vol. 51, No. 8, 2004, pp. 1233-1247.

Persson et al., "Reducing the Effect of Pixel Crosstalk in Phase Only Spatial Light Modulators," Optics Express, vol. 20, No. 20, 2012, pp. 22334-22343.

Apter et al., "On the Fringing-Field Effect in Liquid-Crystal Beam-Steering Devices," Applied Optics, vol. 43, No. 1, 2004, pp. 11-19.

Yamaguchi et al., "Cell Thickness Dependence on Electric Optical Property of Reverse Mode Liquid Crystal Display," Journal of Photopolymer Science and Technology, vol. 27, No. 3, 2014, pp. 287-290.

Wai-Hon Lee, "Binary Computer-Generated Holograms," Applied Optics, vol. 18, No. 21, Nov. 1, 1979, pp. 3661-3669.

Pan et al., "A Review of Dynamic Holographic Three-Dimensional Display: Algorithms, Devices, and Systems," IEEE Transactions on Industrial Informatics, vol. 12, No. 4, Aug. 2016, pp. 1599-1610.

Ma et al., "Analysis of Optical Characteristics of Modulation Devices with Square and Circle Pixels for 3D Holographic Display," Chinese Optics Letters, vol. 13, No. 1, Jan. 10, 2015, pp. 1-5.

Makowski et al., "Performance of the 4k Phase-Only Spatial Light Modulator in Image Projection by Computer-Generated Holography," Photonics Letters of Poland, vol. 8, No. 1, 2016, pp. 26-28.

Choi et al., "Toward Sub-Micron Oxide Thin-Film Transistors for Digital Holography," Journal of the Society for Information Display, vol. 25, No. 2, 2017, pp. 126-135.

Zheng et al., "Metasurface Holograms Reaching 80% Efficiency," Nature Nanotechnology, vol. 10, Feb. 23, 2015, pp. 308-312.

Wang et al., "Grayscale Transparent Metasurface Holograms," Optica, vol. 3, No. 12, Dec. 2016, pp. 1504-1505.

Ni et al., "Metasurface Holograms for Visible Light," Nature Communications, vol. 4, 2013, pp. 1-6.

Wang et al., "Broadband Metasurface Holograms: Toward Complete Phase and Amplitude Engineering," Scientific Reports, vol. 6, 2016, pp. 1-10.

Chong et al., "Efficient Polarization-Insensitive Complex Wavefront Control Using Huygens' Metasurfaces Based on Dielectric Resonant Meta-atoms," ACS Photonics, vol. 3, 2016, pp. 514-519.

Lin et al., "Optical Metasurfaces for High Angle Steering at Visible Wavelengths," Scientific Reports, vol. 7, 2017, pp. 1-8.

Kuznetsov et al., "Optically Resonant Dielectric Nanostructures," Science, vol. 354, Issue 6314, Nov. 18, 2016, pp. 1-10.

Staude et al., "Tailoring Directional Scattering Through Magnetic and Electric Resonances in Subwavelength Silicon Nanodisks," ACS Nano, vol. 7, No. 9, 2013, pp. 7824-7832.

Decker et al., "High-Efficiency Dielectric Huygens' Surfaces," Advanced Optical Materials, vol. 3, 2015, pp. 813-820.

Yu et al., "High-Transmission Dielectric Metasurface with $2\pi$ Phase Control at Visible Wavelengths," Laser Photonics Review, vol. 9, No. 4, 2015, pp. 412-418.

Sautter et al., "Active Tuning of All-Dielectric Metasurfaces," ACS Nano, vol. 9, No. 4, 2015, pp. 4308-4315.

Rahmani et al., "Reversible Thermal Tuning of All-Dielectric Metasurfaces," Advanced Functional Materials, vol. 27, 2017, pp. 1-7.

Komar et al., "Electrically Tunable All-Dielectric Optical Metasurfaces Based on Liquid Crystals," Applied Physics Letters, vol. 110, 2017, pp. 1-4.

Komar et al., "Tunable Dielectric Metasurfaces Based on the Variation of the Refractive Index of the Environment," Optics and Laser Physics, vol. 106, No. 11, 2017, pp. 709-715.

Komar et al., "Dynamic Beam Switching by Liquid Crystal Tunable Dielectric Metasurfaces," ACS Photonics, vol. 5, No. 5, 2018, pp. 1742-1748.

Yang et al., "Multimode Directionality in All-Dielectric Metasurfaces," Physical Review B, vol. 95, 165426, 2017, pp. 1-10.

Li et al., "Refractive Indices of Liquid Crystals for Display Applications," IEEE/OSA Journal of Display Technology, vol. 1, No. 1, Sep. 2005, pp. 51-61.

Siefke et al., "Materials Pushing the Application Limits of Wire Grid Polarizers Further Into the Deep Ultraviolet Spectral Range," Advanced Optical Materials, vol. 4, 2016, pp. 1780-1786.

M. Rubin, "Optical Properties of Soda Lime Silica Glasses," Solar Energy Materials, vol. 12, 1985, pp. 275-288.

Luk'Yanchuk et al., "Optimum Forward Light Scattering by Spherical and Spheroidal Dielectric Nanoparticles with High Refractive Index," ACS Photonics, vol. 2, 2015, pp. 993-999.

Takano et al., "Cell Design of Gray-Scale Thin-Film-Transistor-Driven Liquid Crystal Displays," IBM Journal of Research and Development, vol. 36, No. 1, 1992, pp. 23-42.

Texas Instruments, "TMS320TC16612/14 High Performance Comes to Small Cell Base Stations," 2011, pp. 1-5.

Timothy D. Wilkinson, "Ferroelectric Liquid Crystal Over Silicon Devices," Liquid Crystals Today, vol. 21, No. 2, Apr. 2012, pp. 34-41.

Forth Dimension Displays, "Structured Illumination at the River Forth, " https://www.forthdd.com, 2022, pp. 1-6.

Forth Dimension Displays, "All Digital Time Domain Imaging QXGA SLM," https://www.forthdd.com/wp-content/uploads/2017/05/OV0023AA-QXGA-SLM-Product-Overview.pdf, 2022, pp. 1-2.

Forth Dimension Displays, "All Digital Time Domain Imaging M249 SXGA Microdisplay," https://www.forthdd.com/wp-content/uploads/2017/12/OV0020AA-M249-SXGA-Microdisplay-Product-Overview.pdf, 2022, pp. 1-2.

Malgorzata et al., "LCoS Spatial Light Modulators as Active Phase Elements of Full-Field Measurement Systems and Sensors," Metrology and Measurement Systems, vol. XIX, No. 3, 2012, pp. 445-458.

\* cited by examiner (a) 1 x 1 (0.36μm)

(b) 2 x 2 (0.72μm)

(c) 3 x 3 (1.08μm)

(d) 4 x 4 (1.44μm)

(e) 5 x 5 (1.8μm)

SPATIAL LIGHT MODULATOR AND METHOD OF FORMING THE SAME

TECHNICAL FIELD

Various aspects of this disclosure relate to a spatial light modulator. Various aspects of this disclosure relate to a method of forming a spatial light modulator.

BACKGROUND

A spatial light modulator (SLM) is a two-dimensional (2D) optical device that can spatially modulate the amplitude (or intensity), phase or polarization of an optical wave front. Current commercially available SLMs include digital micro-mirror devices (DMD), liquid crystal displays (LCD), liquid crystal on silicon (LCOS) devices, and ferroelectric liquid crystal on silicon (FLCOS) devices, among others. They can be found in many applications such as optical switching, optical beam steering, image projection, three-dimensional (3D) displays, virtual-reality (VR) and augmented-reality (AR) displays, head-mounted display, holographic projection, holographic near-eye displays, and holographic 3D displays.

Liquid-crystal-based spatial light modulators (LC-SLMs) can be classified into two types, i.e. amplitude-only and phase-only SLMs and can be either transmissive or reflective. The amplitude of light is modulated by varying the linear polarization direction of the incident light passing through a linear polarizer, while the phase retardation may be modulated by electrically modifying the optical refractive index along the light path. The amplitude and phase are difficult to modulate simultaneously and independently with a single SLM. The complex amplitude modulation technique based on two transmissive amplitude-only SLMs has been applied to the design of 3D see-through head-mounted displays.

Unlike a DMD device, which operates as a purely binary amplitude-only reflective SLM, a phase-only LCOS device modulates the phase of the reflected wave front with a depth of 8-12 bits, while a FLCOS device is a purely binary phase-only reflective SLM.

The total phase retardation $\delta$ of light as it passes a reflective phase-only LCOS device is provided by:

$$\delta = 2\pi \Delta n 2d / \lambda_0 \quad (1)$$

where $\lambda_0$ is the vacuum wavelength of the incident light, d is the thickness of the device (i.e. liquid crystal (LC) layer), and $\Delta n$ is the birefringence of the LC, which may be defined as:

$$\Delta n = n_e - n_0 \quad (2)$$

where $n_0$ is the ordinary refractive index for incident light with the electric field polarization direction perpendicular to the director of LC molecules and $n_e$ is the extraordinary refractive index for that parallel to the director. In order to achieve a phase modulation of $2\pi$, the LC thickness of a reflective phase-only LCOS device is required to be $$d = \lambda_0 / 2\Delta n \quad (3)$$

the thickness of a transmissive phase-only LC-SLM device may be increased by two times and the thickness of a transmissive amplitude-only LC-SLM device may be the same as that of a reflective phase-only LCOS device. Since the switching rise and decay times are dependent on the square of the device thickness ($d^2$), it is important to minimize the LC layer thickness in order to increase the switching speed of LC-SLM devices.

Phase-only LC-SLMs can be used to alter the shape of a laser wave front to achieve different functionalities such as beam shaping, complex beam forming, aberration correction and many others. One of the functionalities involves the deflection of a laser beam for beam steering applications. However, conventional LC-SLMs have a large ratio between the LC layer thickness and pixel pitch that results in a fringing field between pixels. The gradual voltage changes (known as 'fringing fields') across the border of neighbouring pixels may cause strong pixel crosstalk, which results in a reduction in the attainable diffraction efficiency, and a limitation of the maximum deflection angle of the device. Moreover, the driving voltage strongly depends on the LC cell thickness. As a general rule, the threshold voltage decreases with the cell thickness. Therefore, it is necessary to reduce the LC layer thickness in order to reduce the crosstalk as well as the power consumption of the device.

On the other hand, SLMs may also be used for digital holographic displays based on computer-generated holograms. The pixel pitch is one of key parameters that determines both the size and viewing angle or field of view (FOV) of reconstructed 3D images. A higher resolution and a smaller pixel pitch of the SLMs allow a bigger image size and a larger viewing angle (FOV). Advanced high-resolution SLM devices with submicron pixel pitches are required for wide viewing-angle holographic display applications. However, the smallest pixel pitch of commercially available SLMs is currently 3.74 μm, far larger than the wavelength of light in the visible range. Current limitation for fabrication of LC-SLM devices with pixel pitches smaller than 3 μm is related to the strong pixel crosstalk caused by the reduction in pixel pitch while keeping the same cell thickness.

SUMMARY

Various embodiments may provide a spatial light modulator. The spatial light modulator may include a first electrode arrangement. The spatial light modulator may also include a second electrode arrangement. The spatial light modulator may additionally include a liquid crystal (LC) layer between the first electrode arrangement and the second electrode arrangement. The spatial light modulator may also include one or more nanoantennas in contact with the liquid crystal layer. The first electrode arrangement and the second electrode arrangement may be each configured to allow at least a portion of light to pass through.

Various embodiments may provide a method of forming a spatial light modulator. The method may include forming a first electrode arrangement. The method may also include forming a second electrode arrangement. The method may further include forming a liquid crystal layer between the first electrode arrangement and the second electrode arrangement. The method may additionally include forming one or more nanoantennas in contact with the liquid crystal layer. The first electrode arrangement and the second electrode arrangement may each be configured to allow at least a portion of light to pass through.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or modulators is analogously valid for the other methods or modulators. Similarly, embodiments described in the context of a method are analogously valid for a modulator, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1:
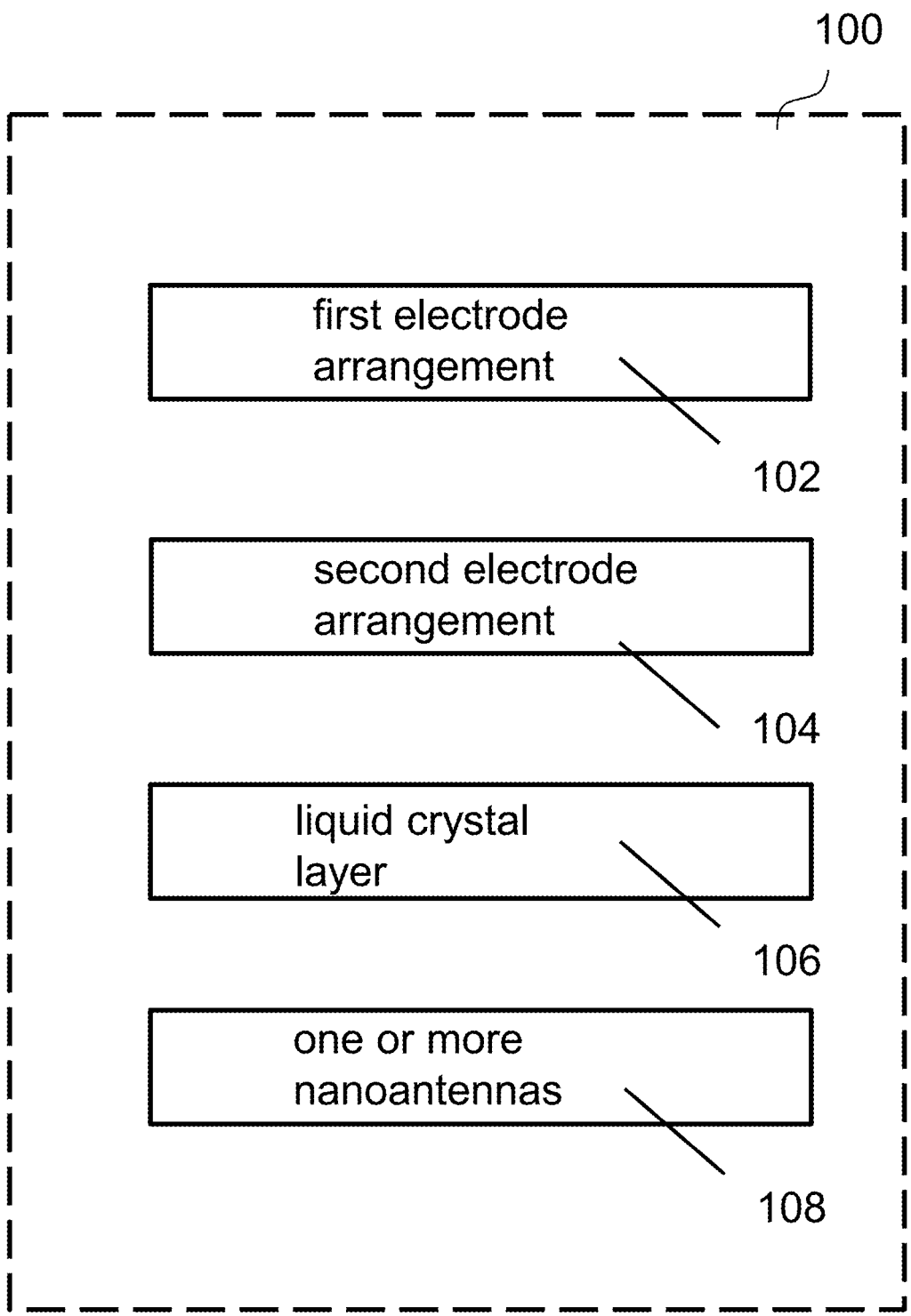
FIG. 1 is a general illustration of a spatial light modulator according to various embodiments.

FIG. 1 is a general illustration of a spatial light modulator 100 according to various embodiments. The spatial light modulator 100 may include a first electrode arrangement 102. The spatial light modulator 100 may also include a second electrode arrangement 104. The spatial light modulator 100 may additionally include a liquid crystal (LC) layer 106 between the first electrode arrangement 102 and the second electrode arrangement 104. The spatial light modulator 100 may also include one or more nanoantennas 108 in contact with the liquid crystal layer 106. The first electrode arrangement 102 and the second electrode arrangement 104 may be each configured to allow at least a portion of light to pass through.

In other words, the spatial light modulator 100 may also include a liquid crystal layer 106 sandwiched between the first electrode 102 and the second electrode 104, and one or more nanoantennas 108 embedded in the crystal layer 106.

For avoidance of doubt, FIG. 1 serves to highlight the various features of a spatial light modulator 100 according to various embodiments, and does not serve to indicate or limit for instance, the size, shapes, arrangement etc. of the modulator 100 or its components.

Various embodiments may provide a reduction in the thickness of the liquid crystal layer 106 by inclusion of the one or more nanoantennas 108. The one or more nanoantennas 108 may be configured to act as Huygens' sources to reduce or minimize reflection or backward scattering.

In various embodiments, the liquid crystal layer 106 may be configured to switch between a first state and a second state. The liquid crystal layer 106 may be configured to switch liquid crystal directors between a first state and a second state. The one or more nanoantennas 108 are configured to act as Huygens' sources in at least one state selected from the first state and the second state.

The thickness of the liquid crystal layer 106 may be smaller than the thickness required if no nanoantennas are present. A thickness of the liquid crystal layer may be smaller than a vacuum wavelength ($\lambda_o$) of the light.

The reduction of the liquid crystal layer 106 may result in an increase of the switching speed, a reduction of the driving voltage, a suppression of pixel crosstalk, a reduction of the pixel pitch, and/or a reduction of the pixel size.

The spatial light modulator 100 may be a transmissive spatial light modulator.

In various embodiments, the first electrode arrangement 102 and/or the second electrode arrangement 104 are transparent. The light may be incident on the first electrode 102 and the second electrode 104. In various embodiments, the first electrode arrangement 102 and/or the second electrode arrangement 104 may be configured to allow more than 80% of the light, or more than 90% of the light, more than 95% of the light, or more than 99% of the light to pass through.

In the current context, "light" as referred herein may refer to visible light, infrared light, or any combinations thereof. In various embodiments, light may be visible light, which may have a wavelength or range of wavelengths selected from 400 nm to 700 nm.

Each of the nanoantennas 108 may include one or more dimensions less than 100 nm. Each of the nanoantennas 108 may include one or more dimensions less than a wavelength or range of wavelengths of the light.

The one or more nanoantennas 108 may include a dielectric material or a semiconductor material.

The one or more nanoantennas 108 may include any one material selected from a group consisting of titanium oxide ($TiO_2$), silicon (Si), germanium (Ge), gallium nitride (GaN), gallium phosphide (GaP), indium phosphide (InP), gallium arsenide (GaAs), silicon nitride (SiN), and copper oxide ($CuO_2$).

The one or more nanoantennas 108 may each be of a shape selected from a cylinder (e.g. with a circular cross-section or an elliptical cross-section), a cuboid, a cross, a ring, and a c-shape.

In various embodiments, the spatial light modulator 100 may have a plurality of pixels.

In various embodiments, each of the plurality of pixels may include a single nanoantenna of the plurality of nanoantennas 108. In various other embodiments, each of the plurality of pixels may include more than one nanoantennas of the plurality of nanoantennas 108.

The first electrode arrangement 102 and/or the second electrode arrangement 104 may include a transparent conducting oxide (which may also be referred to as a transparent conductive oxide). The first electrode arrangement 102 and/or the second electrode arrangement 104 may include indium tin oxide (ITO). Alternatively, the first electrode arrangement 102 and/or the second electrode arrangement 104 may include fluorine doped tin oxide (FTO), aluminum-doped zinc oxide, and/or indium-doped cadmium oxide.

In various embodiments, the first electrode arrangement 102 may include a single electrode, and the second electrode arrangement 104 may include a single electrode. In various other embodiments, the first electrode arrangement 102 may include a single electrode; the second electrode arrangement 104 may include a plurality of electrodes. In yet various other embodiments, the first electrode arrangement 102 may include a plurality of electrodes, and the second electrode arrangement 104 may include a single electrode.

In various embodiments, the first electrode arrangement 102 may be over the second electrode arrangement 104.

In various embodiments, the modulator 100 may include a first substrate in contact with the first electrode arrangement 102. The modulator 100 may also include a second substrate in contact with the second electrode arrangement 104.

The first substrate 102 and the second substrate 104 may each include silicon dioxide or soda lime glass.

The liquid crystal layer 106 may include a plurality of uniaxial anisotropic liquid crystals. The plurality of uniaxial anisotropic liquid crystals may each be configured to change orientation upon application of different voltages between the first electrode arrangement 102 and the second electrode arrangement 104.

In various embodiments, the spatial light modulator 100 may be a binary phase-only modulator. The binary phase modulator may be configured to switch between a first state and a second state. The binary phase modulator may be configured to provide a phase change or shift of lit radians more to the light passing through the phase modulator in the second state compared to the first state. The transmission of light through the phase modulator may be greater than 80% in both the first state and the second state.

In various other embodiments, the spatial light modulator 100 may be an amplitude-only modulator. The amplitude modulator may be configured to switch between a first state and a second state. In various embodiments, the transmission of light through the amplitude modulator may be any value more than 80% in the first state, and any value less than 20% in the second state. The difference in phase change/shift in the first state and in the second state may be very small, e.g. <0.03 π radians.

In yet various other embodiments, the spatial light modulator 100 may be a phase and amplitude modulator. The modulator 100 may be configured to modulate amplitude and phase simultaneously and independently. For instance, the modulator 100 may be configured to modulate amplitude when the liquid crystals in the liquid crystal layer 106 are oriented from a first angle to a second angle, and may be configured to modulate phase when the liquid crystals in the liquid crystal layer 106 are oriented from a third angle to a fourth angle.

In various embodiments, a height of each of the one or more nanoantennas 108 may be equal to a thickness of the liquid crystal layer 106.

Figure 2:
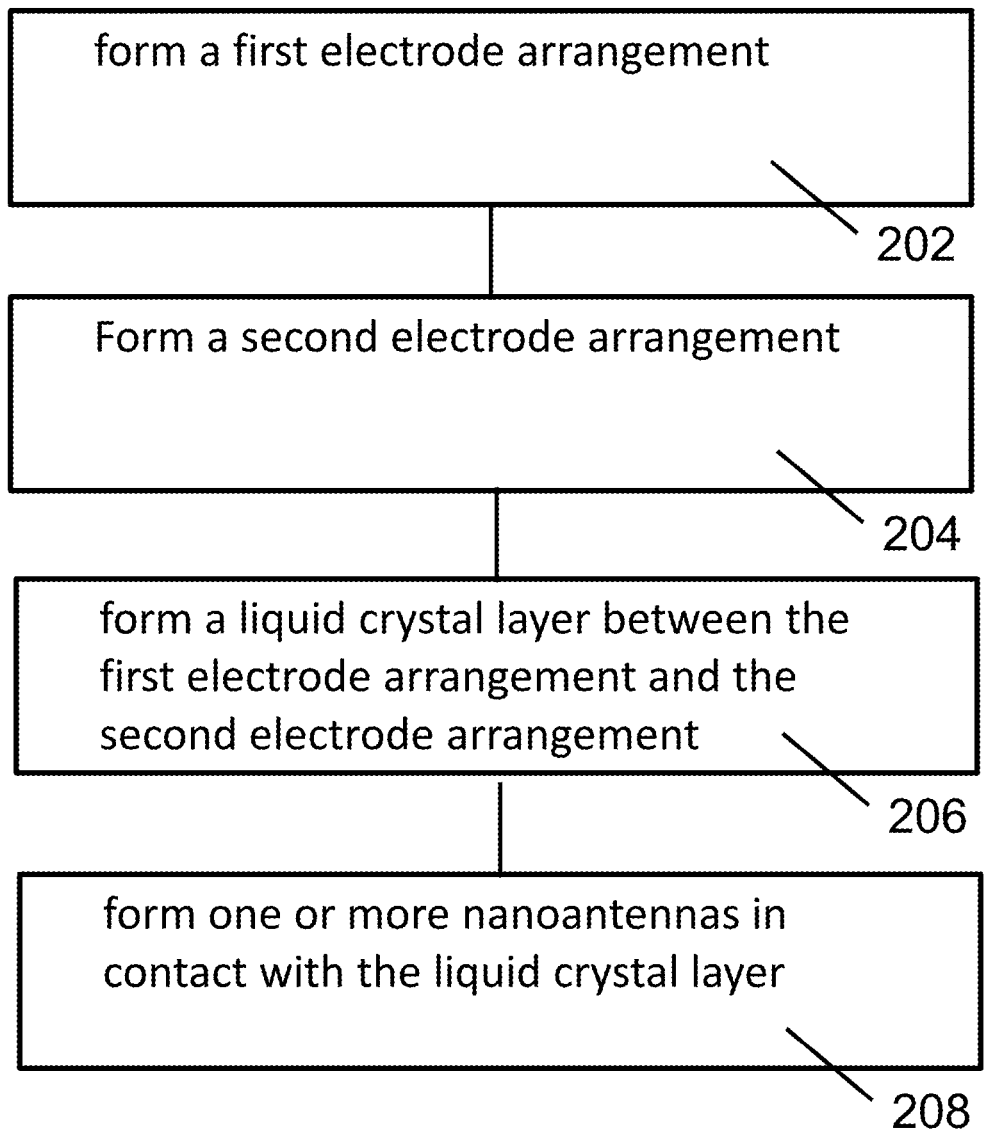
FIG. 2 is a general illustration of a method of forming a spatial light modulator according to various embodiments.

FIG. 2 is a general illustration of a method of forming a spatial light modulator according to various embodiments. The method may include, in 202, forming a first electrode arrangement. The method may also include, in 204, forming a second electrode arrangement. The method may further include, in 206, forming a liquid crystal layer between the first electrode arrangement and the second electrode arrangement. The method may additionally include, in 208, forming one or more nanoantennas in contact with the liquid crystal layer. The first electrode arrangement and the second electrode arrangement may each be configured to allow at least a portion of light to pass through.

In other words, the method of forming the first electrode arrangement, the second electrode arrangement, the liquid crystal layer, and the one or more nanoantennas.

For avoidance of doubt, FIG. 2 does not indicate the sequence of steps. For instance, step 202 may occur before, after, or at the same time as step 204.

In various embodiments, the first electrode arrangement may be formed on or in contact with a first substrate. The second electrode arrangement may be formed on or in contact with a second substrate.

Various embodiments may provide a method of designing a spatial light modulator. The method may include selecting a shape for the one or more nanoantennas and fixing a parameter, such as a thickness of the liquid crystal layer. The method may further include fixing a geometrical parameter of the one or more nanoantennas, e.g. the height, and varying a further geometrical parameter of the one or more nanoantennas, e.g. the radius. The method may further include identifying and determining a value of the further geometrical parameter at which there is overlapping of resonances.

The method of designing may be carried by using a computer.

Various embodiments may significantly reduce the liquid crystal (LC) cell thickness in LC-based transmissive spatial light modulators (SLM) for binary phase-only and for continuous amplitude-only modulation. Various embodiments may include an array of pixels.

Figure 3A:
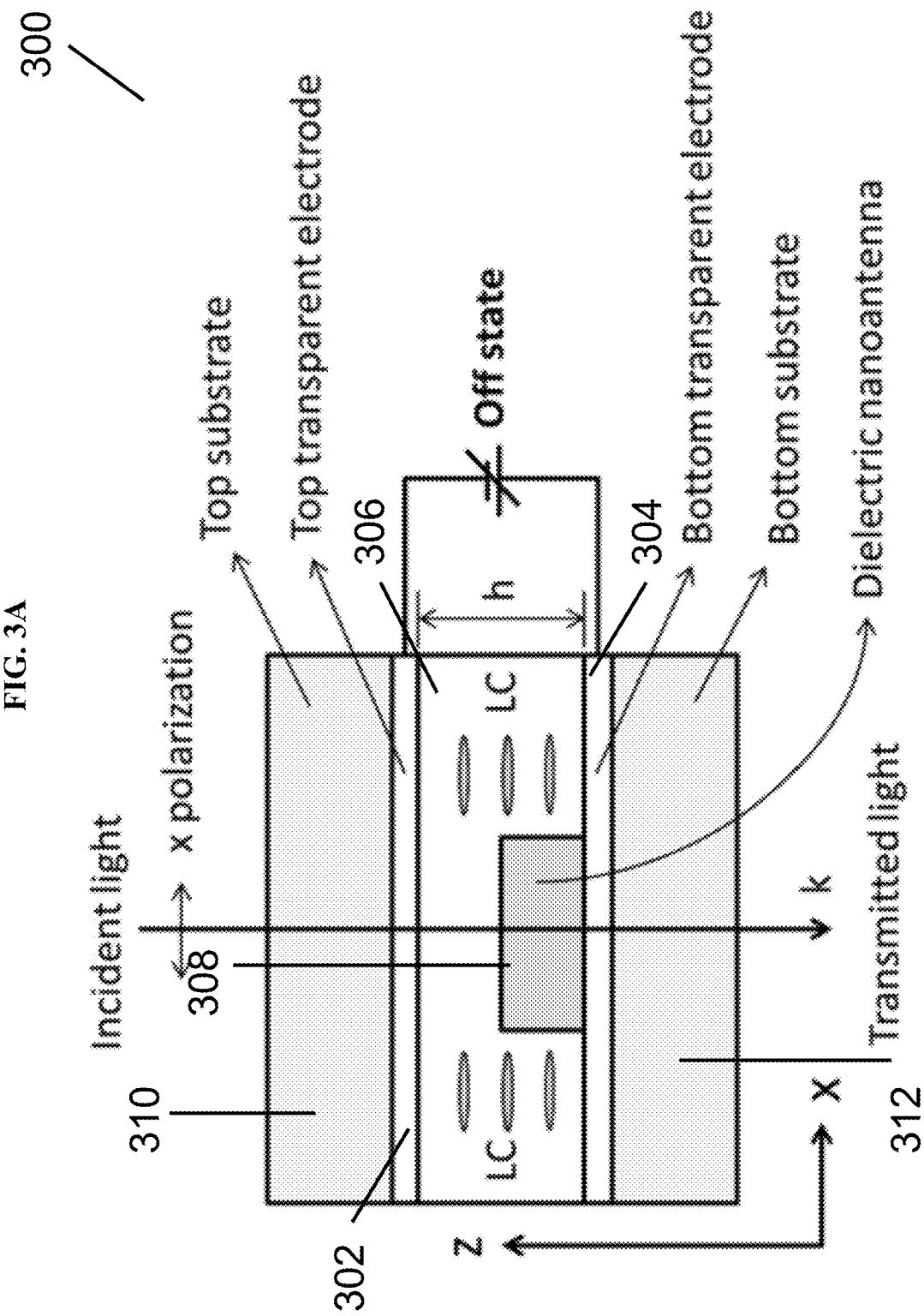
FIG. 3A is a side cross-sectional schematic of one pixel of a spatial light modulator for binary phase-only and continuous amplitude-only light modulation according to various embodiments at an "OFF" state.
Figure 3B:
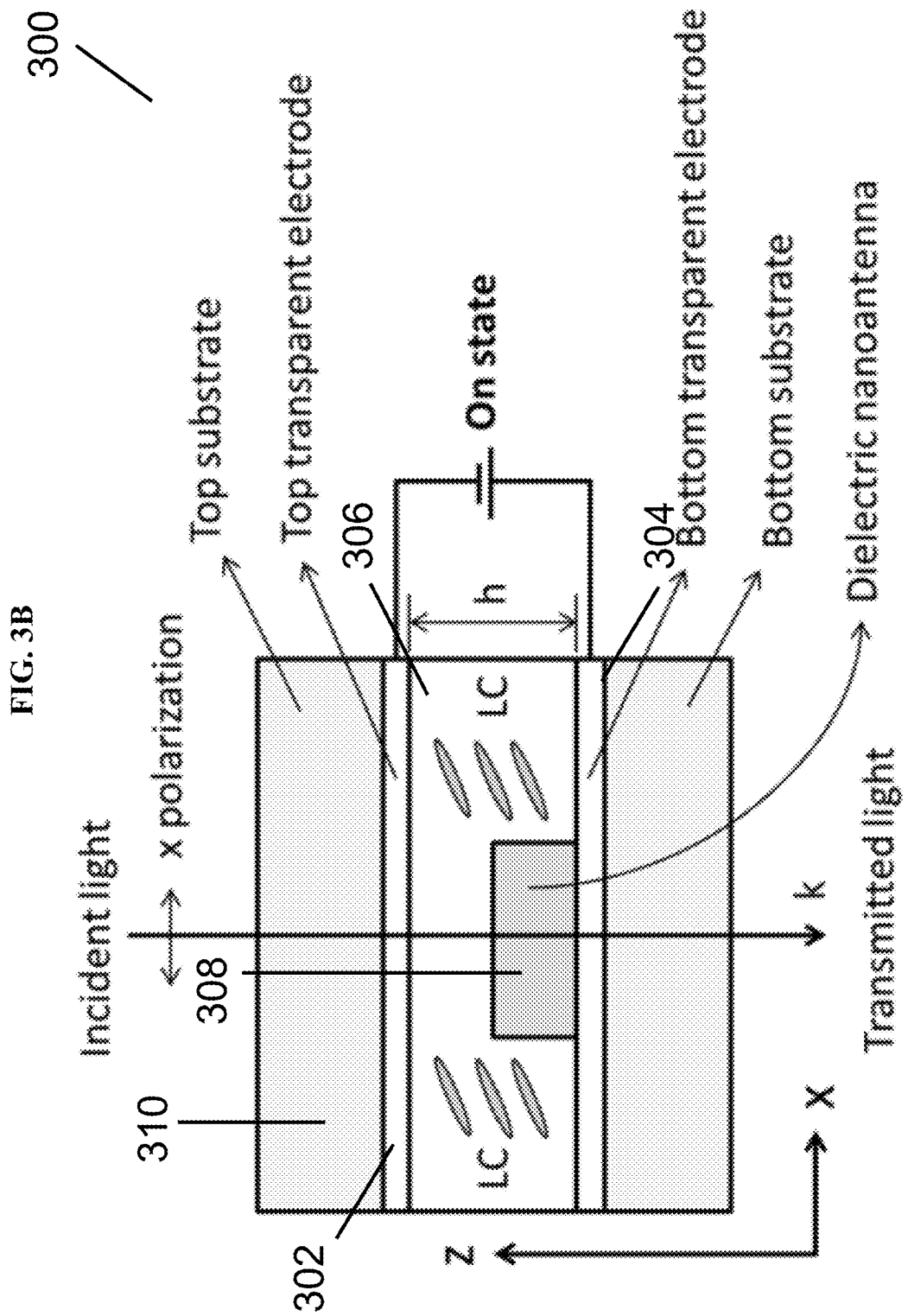
FIG. 3B is a side cross-sectional schematic of the pixel of the spatial light modulator shown in FIG. 3A according to various embodiments in an "ON" state.

FIG. 3A is a side cross-sectional schematic of one pixel of a spatial light modulator 300 for binary phase-only and continuous amplitude-only light modulation according to various embodiments at an "OFF" state. FIG. 3B is a side cross-sectional schematic of the pixel of the spatial light modulator 300 shown in FIG. 3A according to various embodiments in an "ON" state.

The spatial light modulator 300 may include a first electrode arrangement 302. The spatial light modulator 300 may also include a second electrode arrangement 304. The spatial light modulator 300 may additionally include a liquid crystal (LC) layer 306 between the first electrode arrangement 302 and the second electrode arrangement 304. The spatial light modulator 300 may also include a dielectric or semiconductor nanoantenna 308 in contact with the liquid crystal layer 306. The first electrode arrangement 302 and the second electrode arrangement 304 may be each configured to allow at least a portion of light to pass through.

The dielectric or semiconductor nanoantenna 308 may be embedded in the uniaxial anisotropic liquid crystal (LC) layer 306. The LC layer 306 may have a thickness h, and may be between a first substrate 310 and a second substrate 312. The substrates 310, 312 may include a suitable transparent material having a low index of refraction (e.g. <2) at the wavelength of interest.

Examples of these materials at visible frequencies may be a commercial glass such as soda lime. Examples of other materials may be silicon dioxide ($SiO_2$), or other commercial glasses. The substrates may be further coated with transparent conductive materials, serving as transparent electrodes to drive a voltage across the LC cell in the z-direction. An example of possible materials to be used for this purpose at visible frequencies is Indium Tin Oxide (ITO).

Light may impinge normally onto the device 300 with the electric field polarized along the x-direction, as shown in FIG. 3A. Light may incident on the first substrate 310 first before passing through the first electrode 302, the LC layer 306, the second electrode 304, and the second substrate 312. In various other embodiments, light may impinge from the opposite second substrate 312. In various embodiments, light may impinge at a non-normal angle onto the first substrate 310 and/or the second substrate 312.

Uniaxial anisotropic liquid crystals may possess an anisotropic refractive index determined by the orientation of the LC molecules. A rod-like LC molecule may have a rotational symmetry with respect to its long axis, referred to as the LC director. The refractive index of the LC for incident light polarization along the LC director may be referred to as the extraordinary refractive index ($n_e$), while the refractive index of the LC for incident light polarization perpendicular to the LC director may be referred to as the ordinary refractive index ($n_o$).

Figure 4:
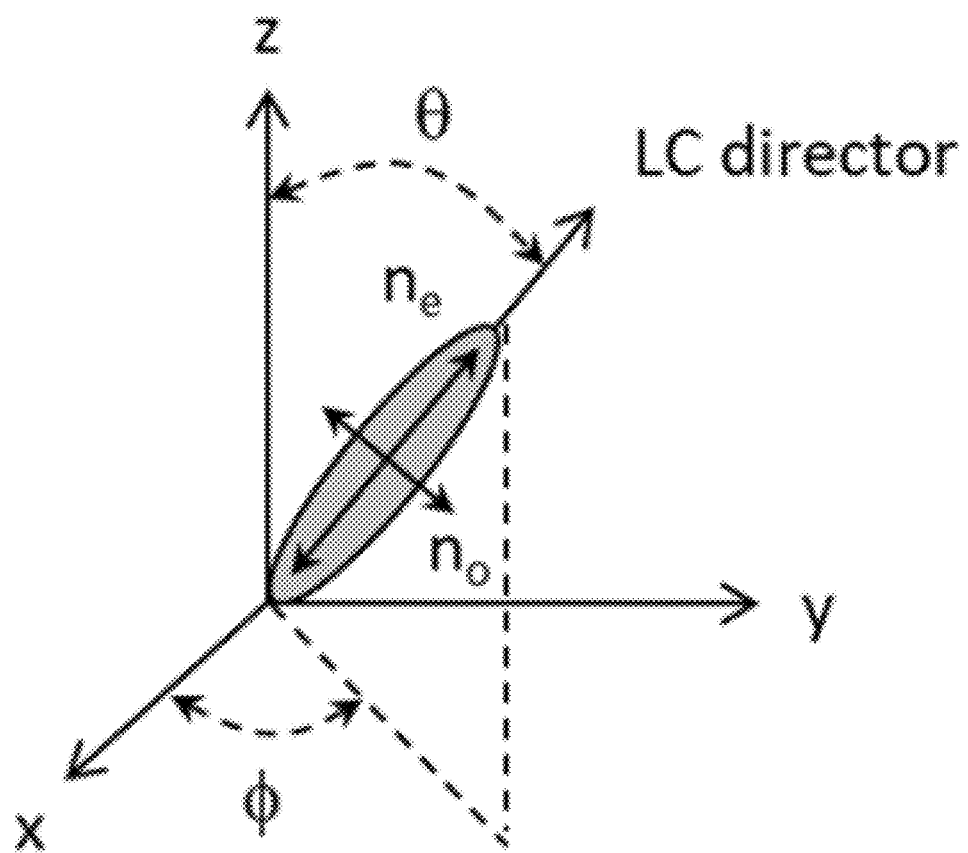
FIG. 4 is a schematic illustrating the orientation of an LC director according to various embodiments in terms of the polar angle (θ) and the azimuthal angle (φ) with respect to the x-y-z coordinate system, as defined in FIGS. 3A-B.

One can define the anisotropic index of the refraction of an LC by specifying its LC director orientation with respect to a coordinate axis. FIG. 4 is a schematic illustrating the orientation of an LC director according to various embodiments in terms of the polar angle ($\theta$) and the azimuthal angle ($\varphi$) with respect to the x-y-z coordinate system, as defined in FIGS. 3A-B.

The orientation of the molecules or LC director may be represented by $\theta$-$\varphi$. For instance, the liquid crystal molecules of the modulator 300 shown in FIG. 3A when no voltage is applied may be in the 90-0 state, meaning a polar angle of 90°, and an azimuthal angle of 0°. When a voltage is applied and the SLM 300 is in the 'ON' state, the polar angle may be changed to between 0° and 90°.

The nanoantennas 308 may be structures or particles with dimensions smaller than the wavelength of light at the operating frequency, and which may be resonant with the incident electromagnetic field.

The nanoantennas 308 may be made of transparent high refractive index materials, having a real part of the refractive index n>2 and an imaginary part of the refractive index k<0.5. The nanoantennas 308 may be made of $TiO_2$, but other suitable materials for operation at visible frequencies would be Si, Ge, GaN, GaP, InP, GaAs, SiN, $CuO_2$, etc. In various embodiments, the nanoantennas 308 may have a cylindrical shape with circular cross section.

Figure 5A:
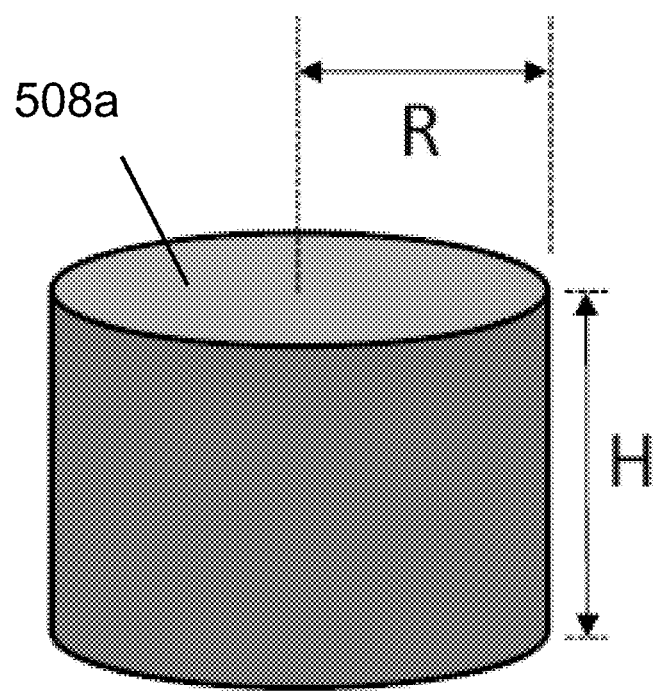
FIG. 5A is a schematic of a nanoantenna having a cylindrical shape with circular cross-section according to various embodiments.

The geometry may be determined by the radius (R) and the height (H), as defined in FIG. 5A. FIG. 5A is a schematic of a nanoantenna 508a having a cylindrical shape with circular cross-section according to various embodiments.

Figure 5B:
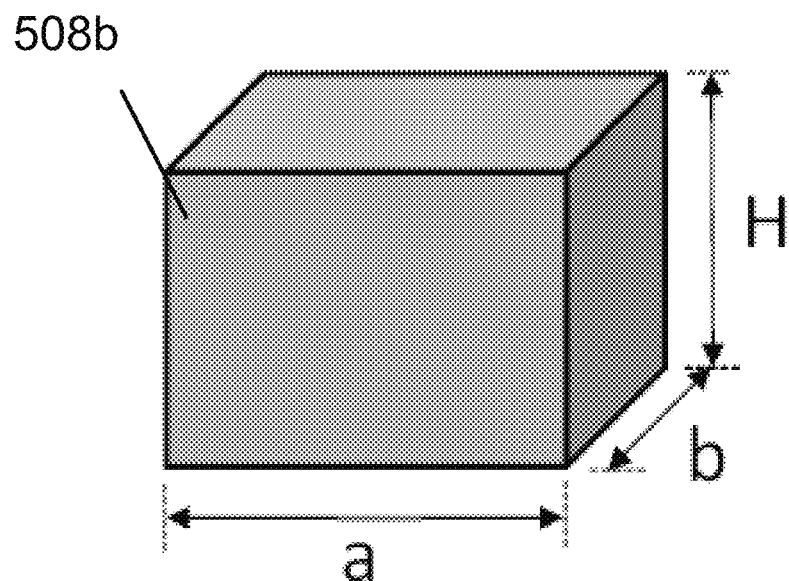
FIG. 5B is a schematic of a nanoantenna having a cuboid shape according to various embodiments.
Figure 5C:
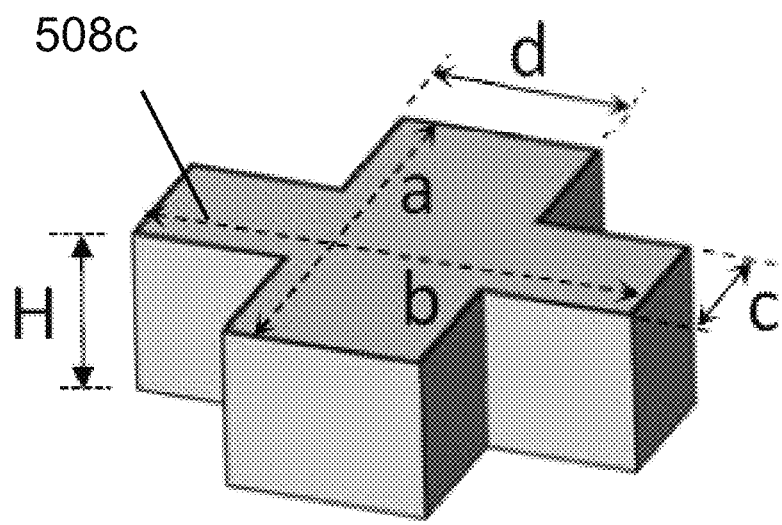
FIG. 5C is a schematic of a nanoantenna having a cross shape according to various embodiments.
Figure 5D:
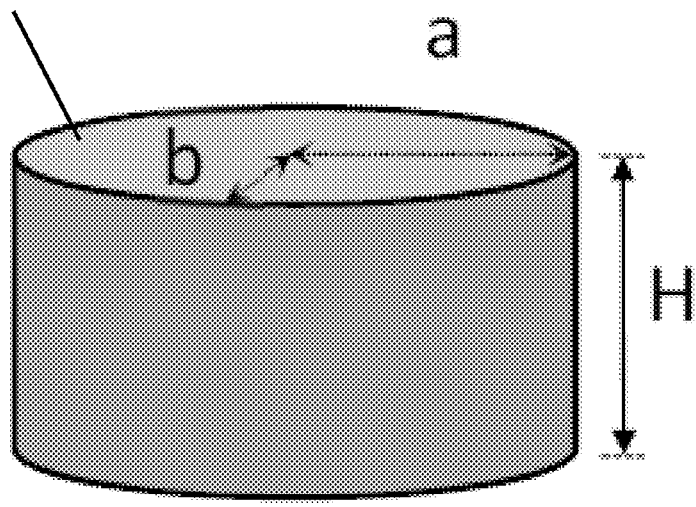
FIG. 5D is a schematic of a nanoantenna having a cylindrical shape with elliptical cross-section according to various embodiments.
Figure 5E:
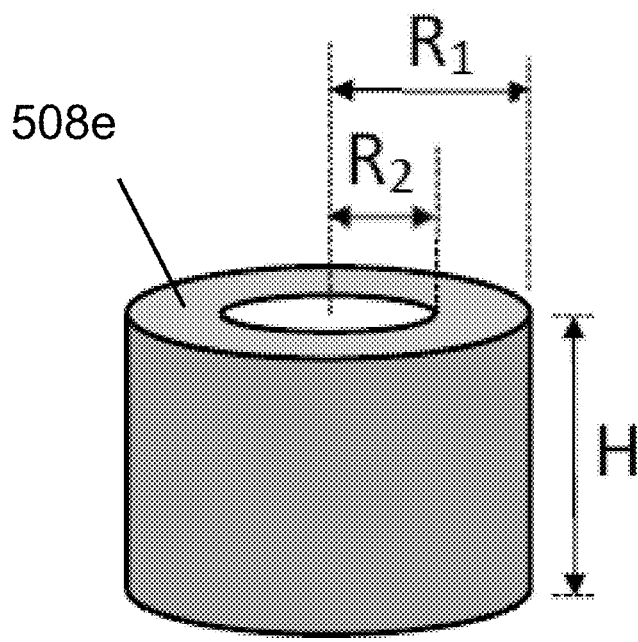
FIG. 5E is a schematic of a nanoantenna having a ring shape according to various embodiments.

However, other possible suitable shapes for the nanoantennas may also be possible. FIG. 5B is a schematic of a nanoantenna 508b having a cuboid shape according to various embodiments. FIG. 5C is a schematic of a nanoantenna 508c having a cross shape according to various embodiments. FIG. 5D is a schematic of a nanoantenna 508d having a cylindrical shape with elliptical cross-section according to various embodiments. FIG. 5E is a schematic of a nanoantenna 508e having a ring shape according to various embodiments.

The nanoantennas may be configured, i.e. their geometry is adjusted, such that they support two or more resonances having appropriate relative amplitude and phases such that the scattering of light from the nanoantennas in the backwards direction is minimized in at least one of the LC director orientations. As a consequence, the transmission through the device may be maximized and the reflection from the device may be minimized. Various embodiments may relate to configuring the nanoantennas to minimize backscattering, meeting the Huygens' condition, or generalized versions of it.

As shown in FIGS. 3A-B, each pixel of an array of pixels forming the spatial light modulator may contain a single nanoantenna according to various embodiments. In various other embodiments, each pixel may include or contain a group of nanoantennas. The group of nanantennas may be arranged in a regular array e.g. 2×2, 3×3, 4×4, 5×5, etc.

Figure 6:
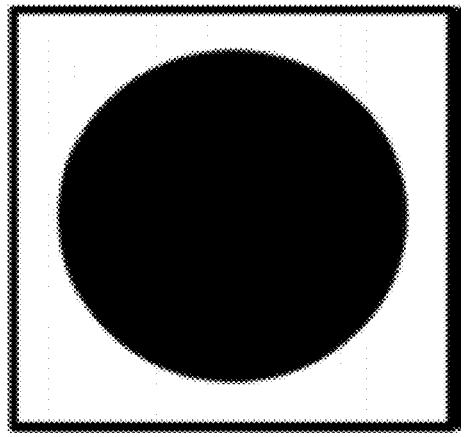
FIG. 6 shows a schematic top view of (a) a pixel including a nanoantenna, (b) a pixel including 2×2 nanoantennas, (c) a pixel including 3×3 nanoantennas, (d) a pixel including 4×4 nanoantennas, and (e) a pixel including 5×5 nanoantennas according to various embodiments.
Figure 6:
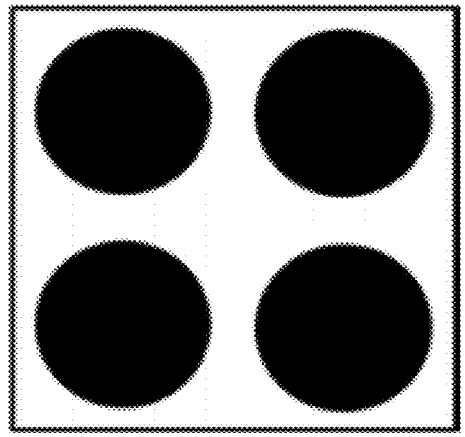
Figure 6:
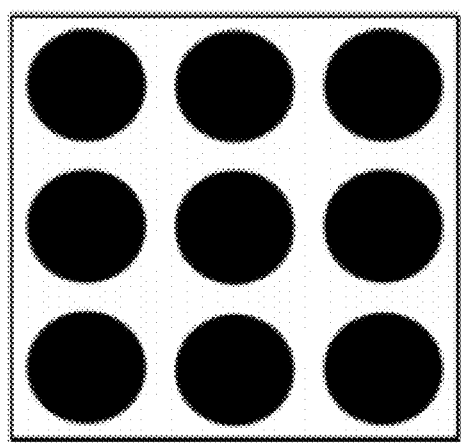
Figure 6:
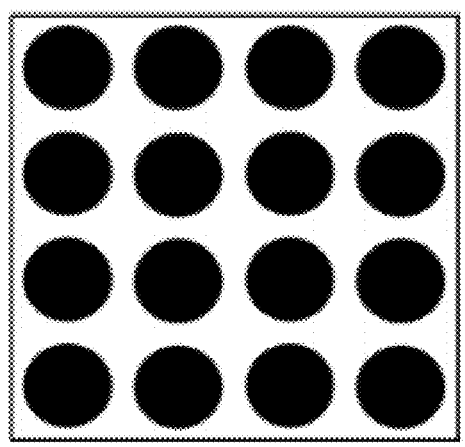
Figure 6:
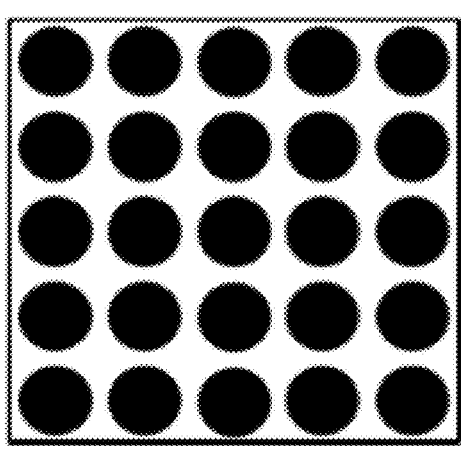

FIG. 6 shows a schematic top view of (a) a pixel including a nanoantenna, (b) a pixel including 2×2 nanoantennas, (c) a pixel including 3×3 nanoantennas, (d) a pixel including 4×4 nanoantennas, and (e) a pixel including 5×5 nanoantennas according to various embodiments. The nanoantennas shown in FIG. 6 may be cylindrical with a circular cross-section.

Figure 7A:
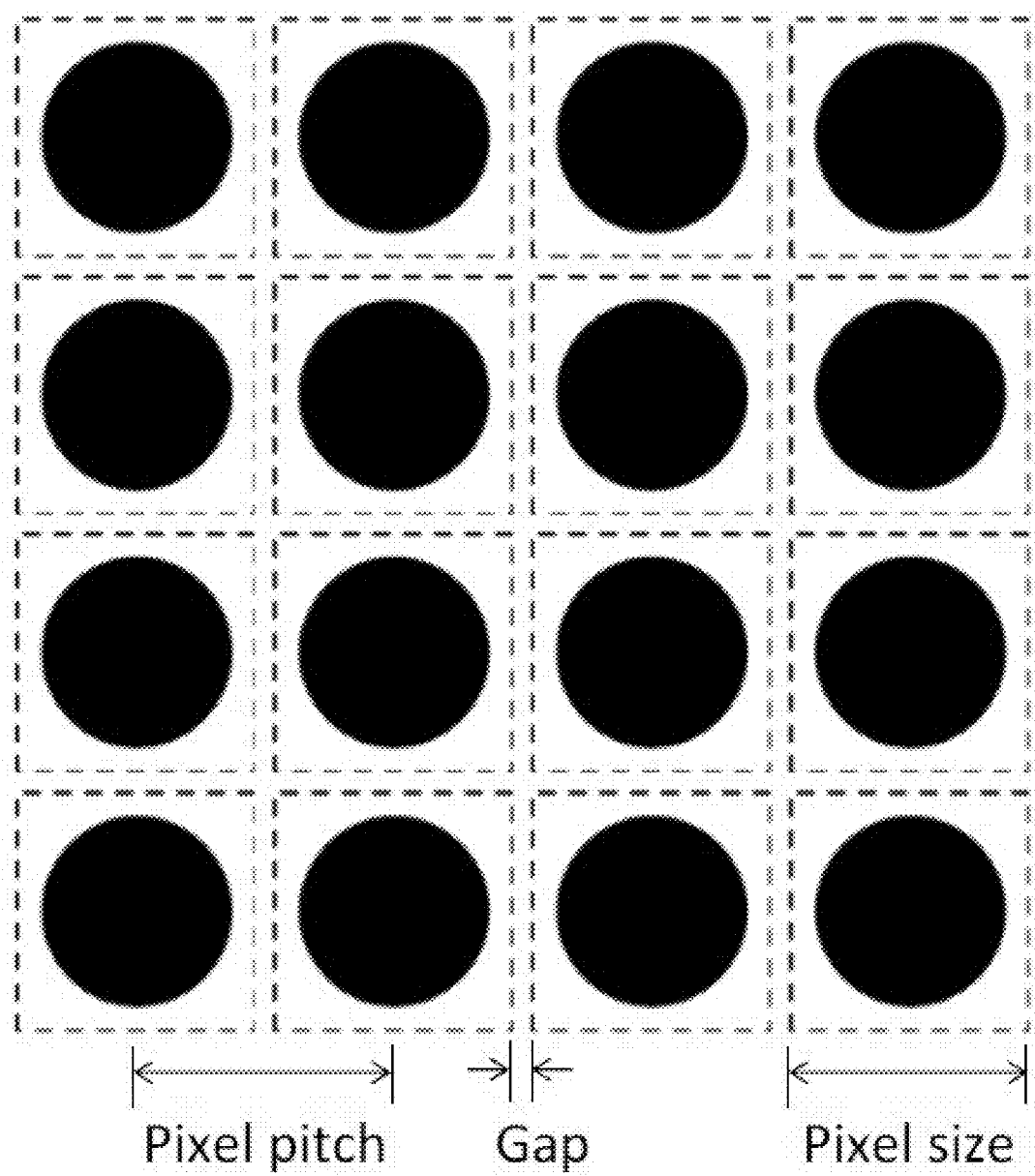
FIG. 7A shows a top view of a pixel array in which each pixel includes 1×1 nanoantenna according to various embodiments.
Figure 7B:
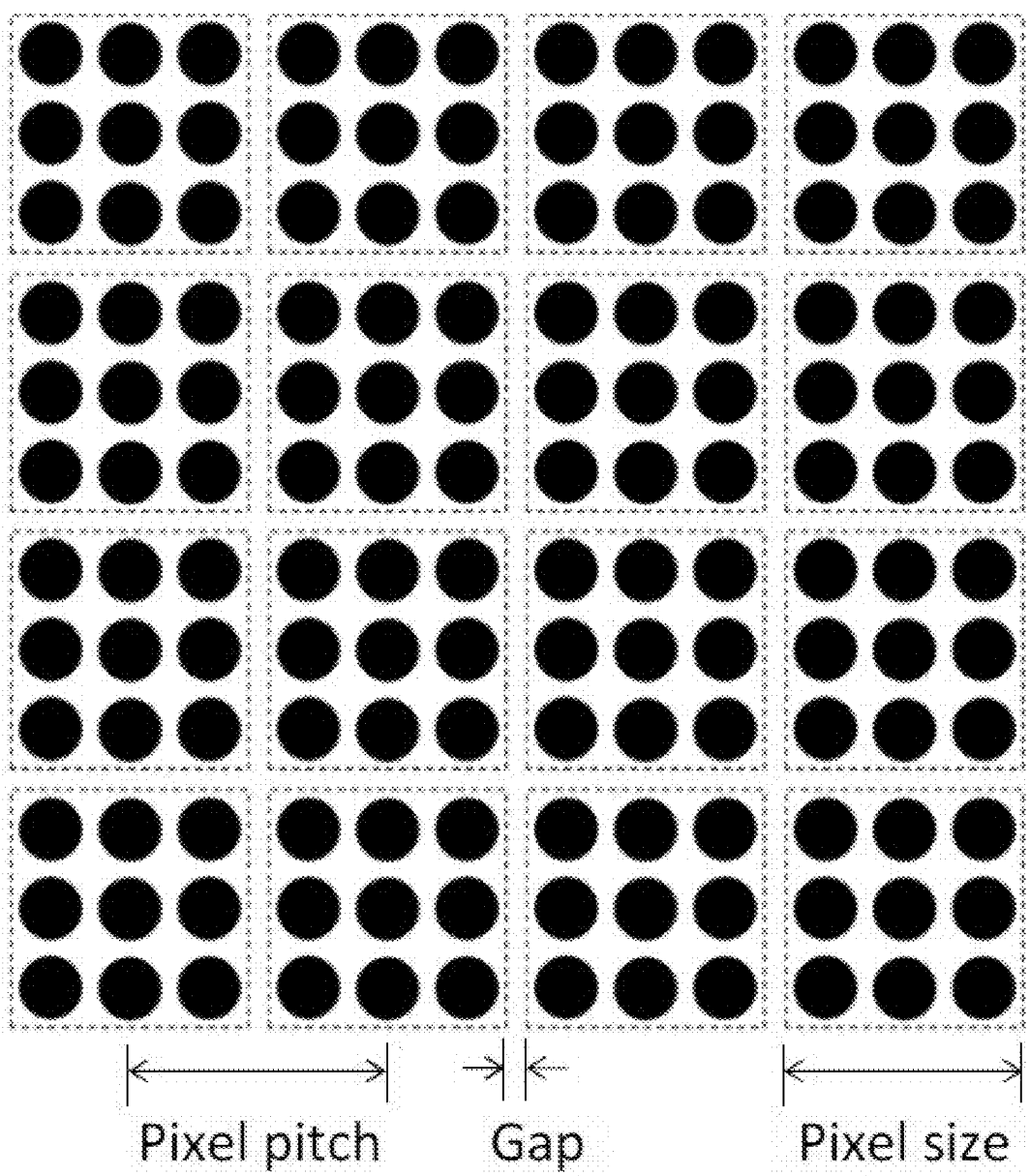
FIG. 7B shows a top view of another pixel array in which each pixel includes 3×3 nanoantennas according to various embodiments.

FIG. 7A shows a top view of a pixel array in which each pixel includes 1×1 nanoantenna according to various embodiments. FIG. 7B shows a top view of another pixel array in which each pixel includes 3×3 nanoantennas according to various embodiments.

The pixel pitch, i.e. the pitch between neighbouring pixels, may be adjustable by including or varying a gap between the neighbouring pixels.

Figure 8A:
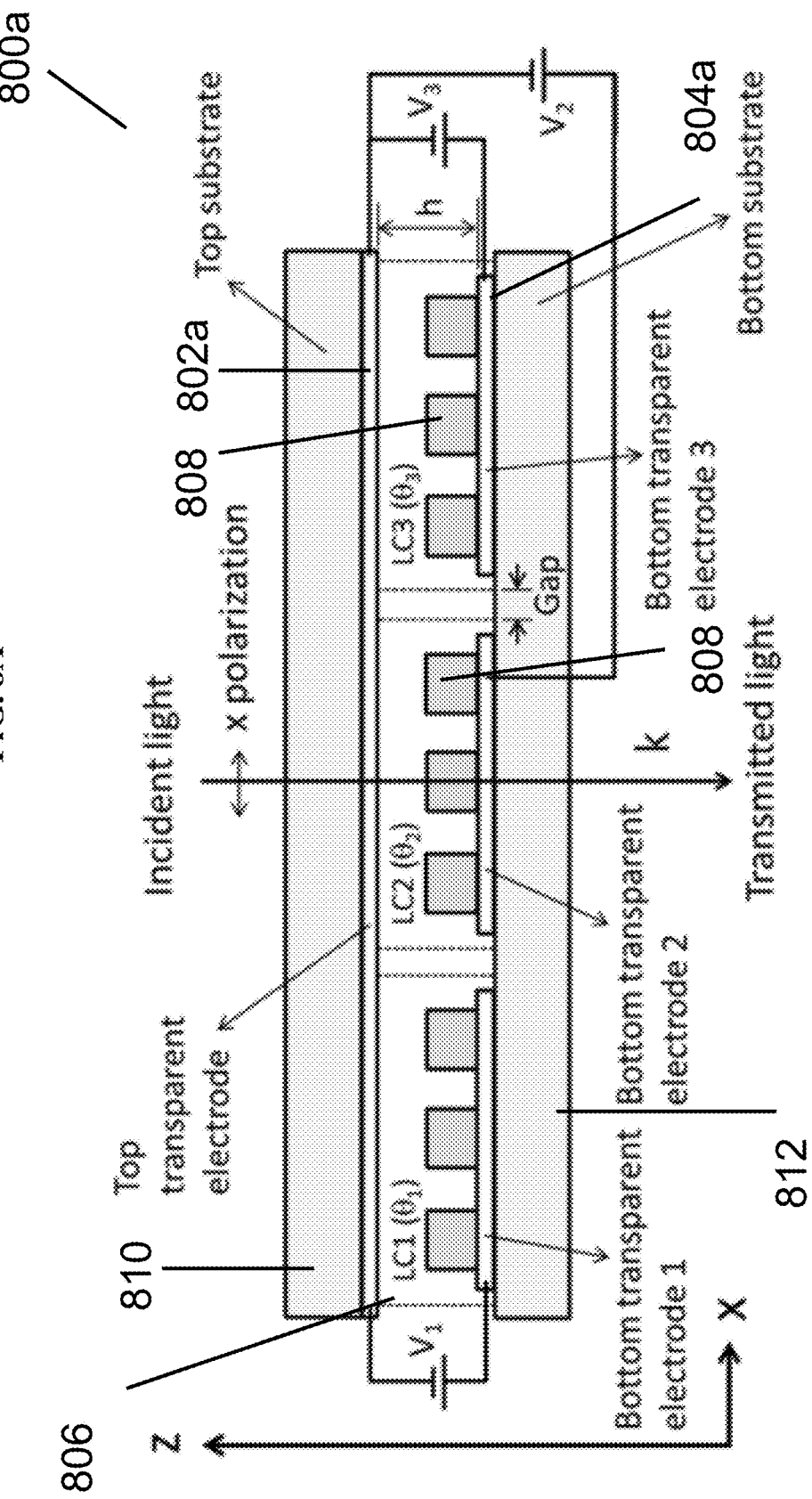
FIG. 8A is a side cross-sectional schematic of a spatial light modulator according to various embodiments.

FIG. 8A is a side cross-sectional schematic of a spatial light modulator 800a according to various embodiments. The spatial light modulator 800a may include a first electrode arrangement 802a including a single electrode. The spatial light modulator 800a may also include a second electrode arrangement 804a including three separate electrodes. The spatial light modulator 800a may additionally include a liquid crystal (LC) layer 806 between the first electrode arrangement 802a and the second electrode arrangement 804a. The spatial light modulator 800a may also include a plurality of nanoantennas 808, e.g. 3×3 nanoantennas on each separate electrode 804a, in contact with the liquid crystal layer 806.

The individual electrodes of the second electrode arrangement 804a may be arranged on the substrate 812 that is closer to the nanoantennas 808, and the common electrode 802a may be arranged on the substrate 810 that is opposite to the nanoantennas 808 as shown in FIG. 8A.

Figure 8B:
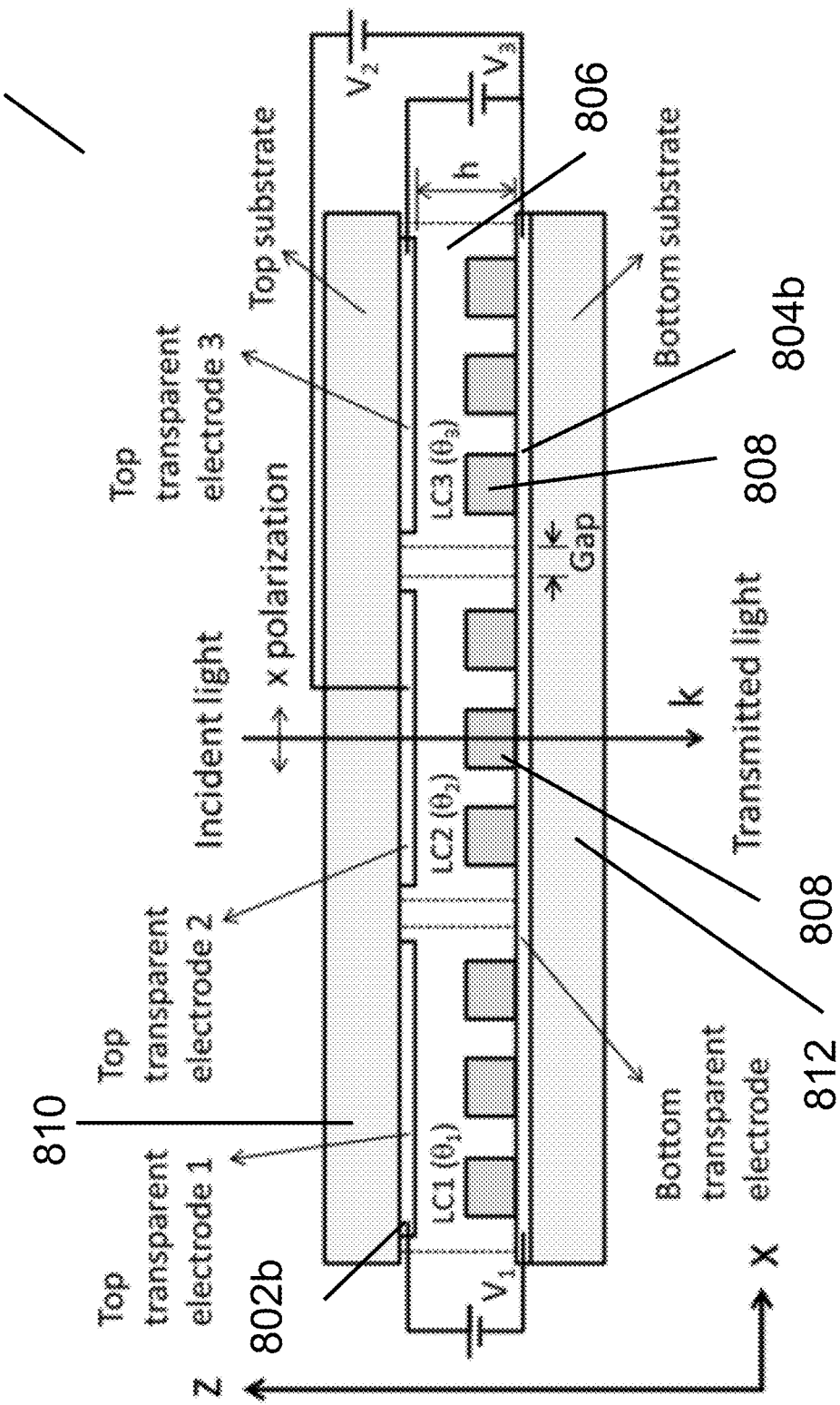
FIG. 8B is a side cross-sectional schematic of another spatial light modulator according to various embodiments.

FIG. 8B is a side cross-sectional schematic of another spatial light modulator 800b according to various embodiments. The spatial light modulator 800b may include a first electrode arrangement 802b including three electrodes. The spatial light modulator 800b may also include a second electrode arrangement 804b including a common electrode. The spatial light modulator 800b may additionally include a liquid crystal (LC) layer 806 between the first electrode arrangement 802b and the second electrode arrangement 804b. The spatial light modulator 800b may also include a plurality of nanoantennas 808, e.g. 3×3 nanoantennas on each separate electrode 804b, in contact with the liquid crystal layer 806.

The common electrode 804b may be arranged on the substrate 812 that is closer to the nanoantennas 808 and the individual electrodes 802b may be arranged on the substrate 810 that is opposite to the nanoantennas 808 as shown in FIG. 8B.

The performance of the SLMs may be characterized in terms of amplitude and phase modulation by means of full numerical simulations. A commercially available electromagnetic solver based on the Finite Difference Time Domain (FDTD) method (Lumerical Solutions®) may be employed. The refractive indices ($n_o$ and $n_e$) of the uniaxial anisotropic liquid crystal may have been taken equal to those of commercially available nematic liquid crystals (E7) provided by MERCK Ltd. The LC, E7, may be selected because of its relatively large birefringence of ~0.2. The nanoantennas may be selected to be $TiO_2$. The refractive index of $TiO_2$ have been measured by ellipsometry, closely following values reported in literature. The refractive index of transparent glass substrate has been taken to be equal to those of the commercially available soda lime glass, which is widely used in liquid crystal display (LCD) industry.

Two examples of SLMs are illustrated below:

Two-Phase-Level-Only Spatial Light Modulation

Various embodiments may relate to a transmissive spatial light modulator providing binary phase modulation (0 and 1π) over an impinging electromagnetic wave. The system may include an array of nanoantennas similar to that represented in FIGS. 3A-B. The dielectric nanoantennas may be cylinders with circular cross sections and may be made of $TiO_2$. The LC layer thickness may be fixed at h=500 nm.

The nanoantenna geometry for satisfying Huygens' condition may first be identified. The LC director may be oriented such that the device is in the "off" state of the device (i.e. 90-0 state). Fulfilling Huygens' condition may lead to inhibition of backward scattering of light from the nanoantenna and therefore, can be identified by a maximization of transmission (minimization of reflection) from the device. To do so we fix one of the geometrical parameters of the nanoantennas, in this case the height, to H=195 nm. The nanoantennas of the device may be arranged in a square lattice with the period P=360 nm.

In order to identify the fulfilment of the Huygens' condition the spectral transmission of light through the device when the radius of the nanoantennas is varied from 120 nm to 160 nm may be analysed.

Figure 9A:
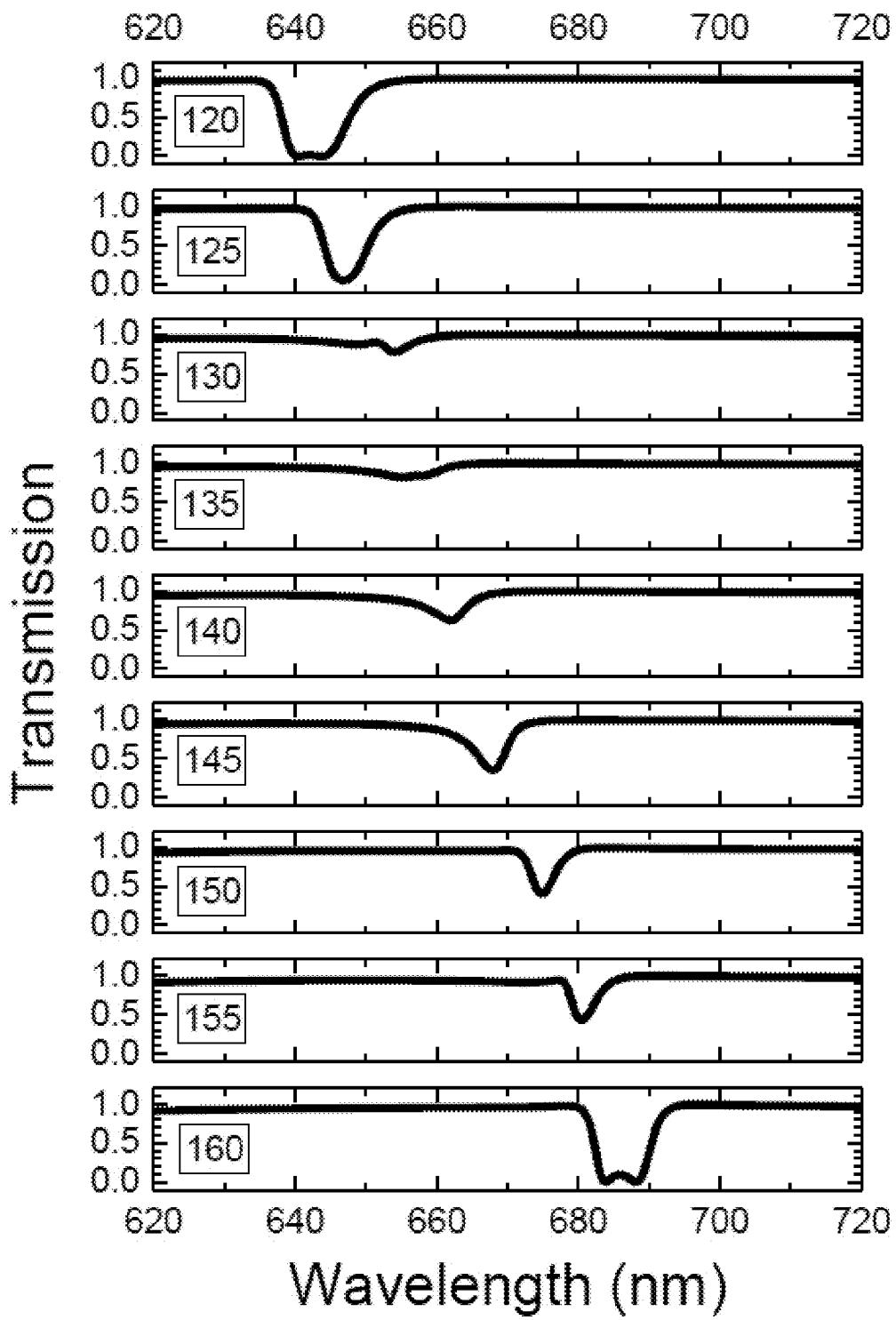
FIG. 9A is a plot of transmission as a function of wavelength (in nanometers or nm) showing the simulated transmission amplitude of waves at different wavelengths in the spatial light modulator according to various embodiments when the radius (R) of the cylindrical nanoantennas are varied from 120 nm to 160 nm.
Figure 9B:
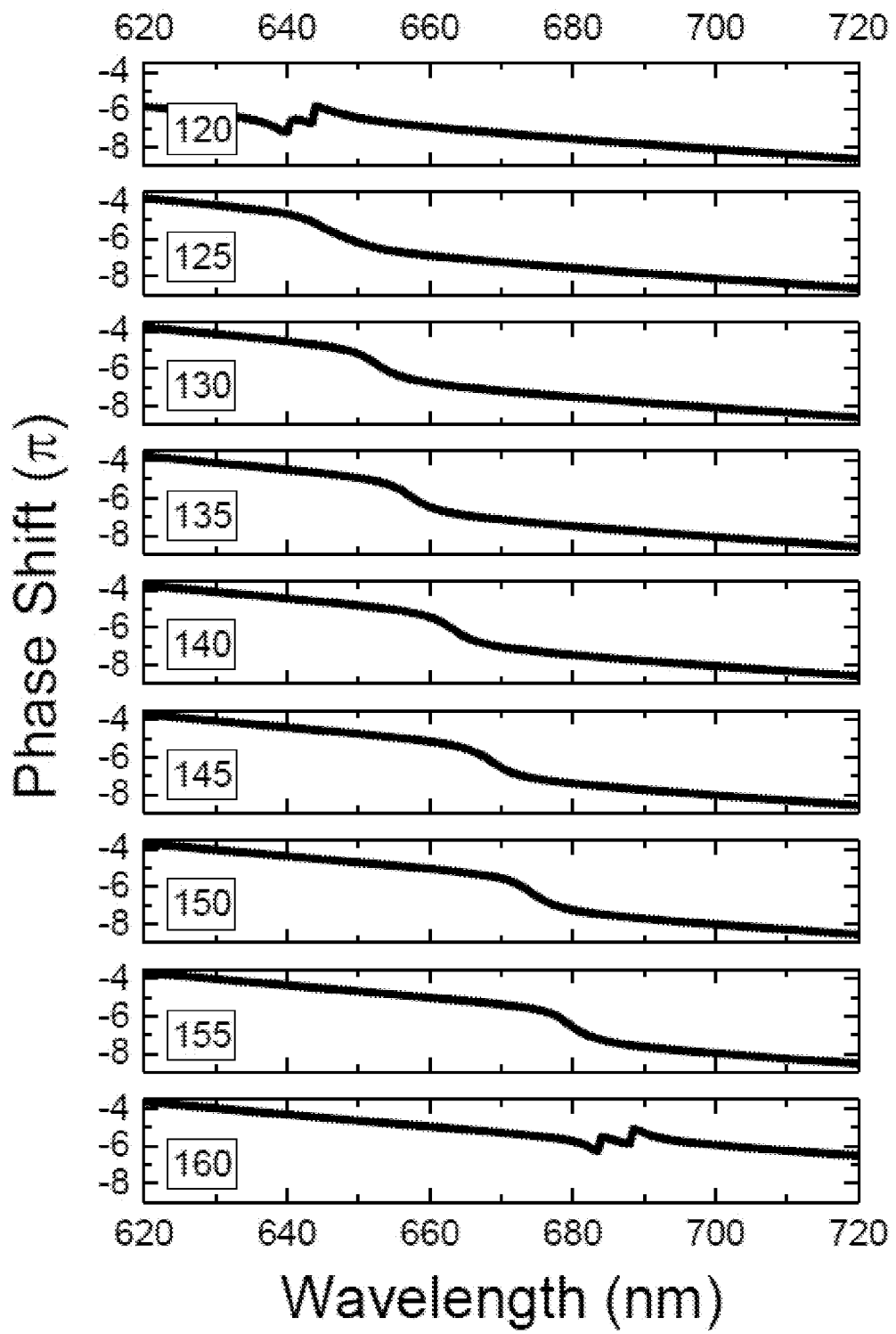
FIG. 9B is a plot of phase shift (in π radians) as a function of wavelength (in nanometers or nm) showing the simulated transmission phase of waves at different wavelengths in the spatial light modulator according to various embodiments when the radius (R) of the cylindrical nanoantennas are varied from 120 nm to 160 nm.

Resonances excited in the nanoantennas may manifest themselves as dips in the spectral transmission of the device, as shown in FIG. 9A, as well as abrupt variations (of the order of 1π) of the phase of the transmitted light, as shown in FIG. 9B.

FIG. 9A is a plot of transmission as a function of wavelength (in nanometers or nm) showing the simulated transmission amplitude of waves at different wavelengths in the spatial light modulator according to various embodiments when the radius (R) of the cylindrical nanoantennas are varied from 120 nm to 160 nm. FIG. 9B is a plot of phase shift (in π radians) as a function of wavelength (in nanometers or nm) showing the simulated transmission phase of waves at different wavelengths in the spatial light modulator according to various embodiments when the radius (R) of the cylindrical nanoantennas are varied from 120 nm to 160 nm. The height (H) of the nanoantennas is fixed at 195 nm and the period (P) of the nanoantennas is fixed at 360 nm. The orientation of the LC director may be set at θ=90° and φ=0°. The thickness of the LC layer may be set at h=0.5 μm.

Upon variation of the radius of the nanoantennas for the fixed height (and, thus, variation of the aspect ratio), it may be seen from the spectra that two dips may spectrally overlap. When this happens the dips disappear, indicating that the Huygens' condition is fulfilled, inhibiting the backward scattering from the particles and therefore maximizing the transmission. The accumulated phase may also add up upon resonance overlapping, bringing the total phase accumulation close to 2 π.

In this particular example, this happens when the radius R=135 nm, under which a high transmission of >80% and a phase shift of 2 π are achieved around the wavelength of 658.5 nm, which may be set as the wavelength of operation of the device.

The wavelength of operation of the device may be scaled up (or down) by increasing (or decreasing) the height of the nanoantennas or the array pitch, and repeating the same analysis.

Provided that the refractive index does not show a significant spectral dispersion, the aspect ratio between the radius and the height to achieve Huygens' condition at a different wavelength may approximately be the same. There is literature available describing an approximate rule relating the lateral size, the height and the refractive index of nanoantennas such that a nanoantenna meets Huygens' condition at a particular wavelength.

Figure 10A:
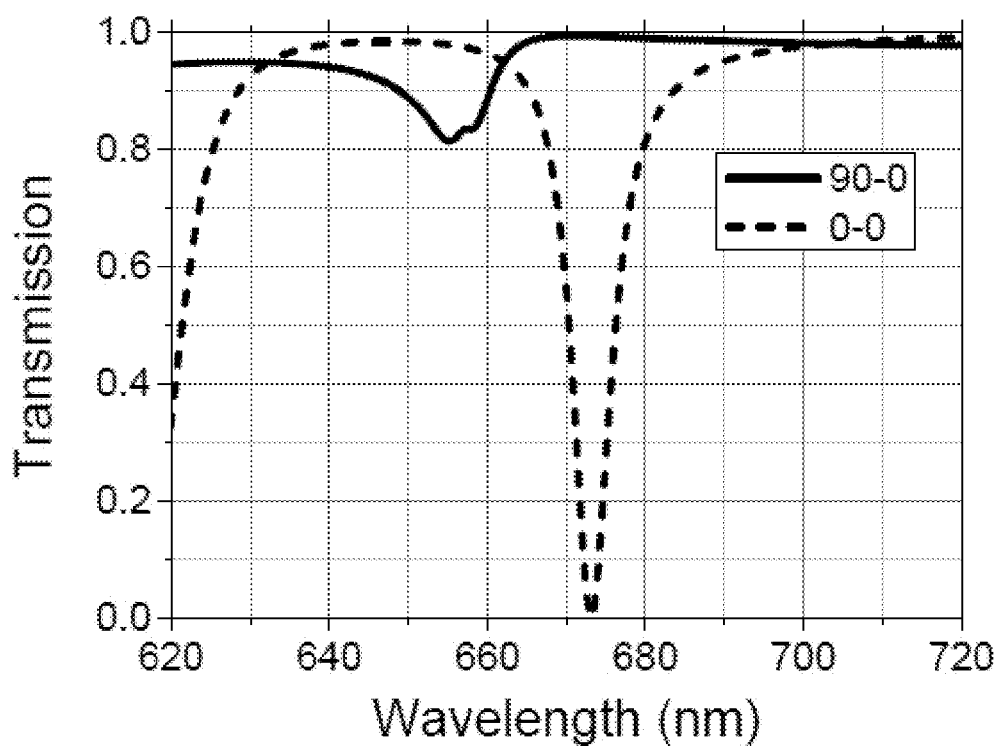
FIG. 10A is a plot of transmission as a function of wavelength (in nanometers or nm) showing the simulated transmission amplitude changes in the spectrum when the liquid crystals of the device according to various embodiments are switched from the 90-0 state to the 0-0 state.
Figure 10B:
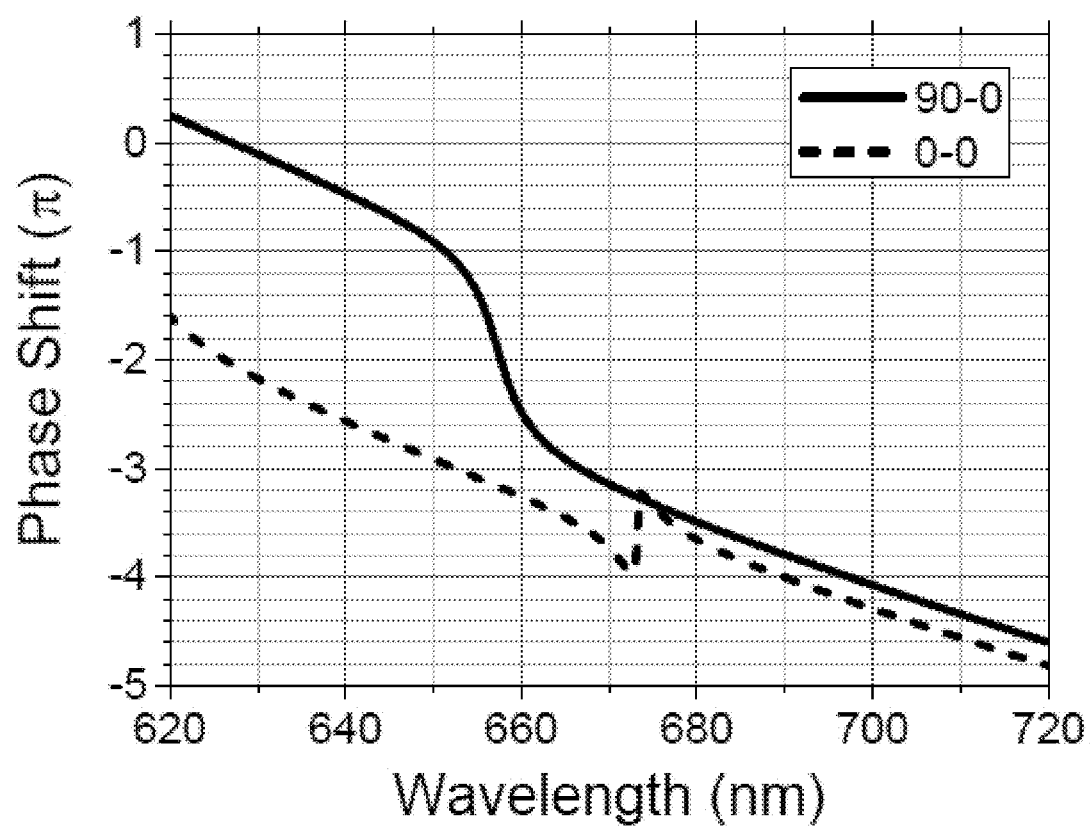
FIG. 10B is a plot of phase shift (in π radians) as a function of wavelength (in nanometers or nm) showing the simulated transmission phase changes in the spectrum when the liquid crystals of the device according to various embodiments are switched from the 90-0 state to the 0-0 state.

Upon reorientation of the LC director in the device, the phase of the transmitted light may be modulated in a binary fashion (phase being 0 or 1 π) while keeping a high transmission (>80%). FIGS. 10A-B show the simulated transmission and phase shift of a plane wave transmitted through the structure described above as a function of wavelength when the liquid crystals are switched from the 90-0 state to the 0-0 state. FIG. 10A is a plot of transmission amplitude as a function of wavelength (in nanometers or nm) showing the simulated transmission showing the changes in the spectrum when the liquid crystals of the device according to various embodiments are switched from the 90-0 state to the 0-0 state. FIG. 10B is a plot of phase shift (in π radians) as a function of wavelength (in nanometers or nm) showing the simulated transmission phase showing the changes in the spectrum when the liquid crystals of the device according to various embodiments are switched from the 90-0 state to the 0-0 state.

At the 90-0 state, the LC director may be orientated such that θ=90°, φ=0°. At the 0-0 state, the LC director may be orientated such that θ=0°, φ=0°. The thickness of the LC layer may be set at h=0.5 μm. The height (H) of the nanoantennas is fixed at 195 nm and the radius (R) is fixed at 135 nm to meet the high-transmission Huygens' condition for the 90-0 LC state. The period (P) of the nanoantennas may be fixed at 360 nm.

Figure 11A:
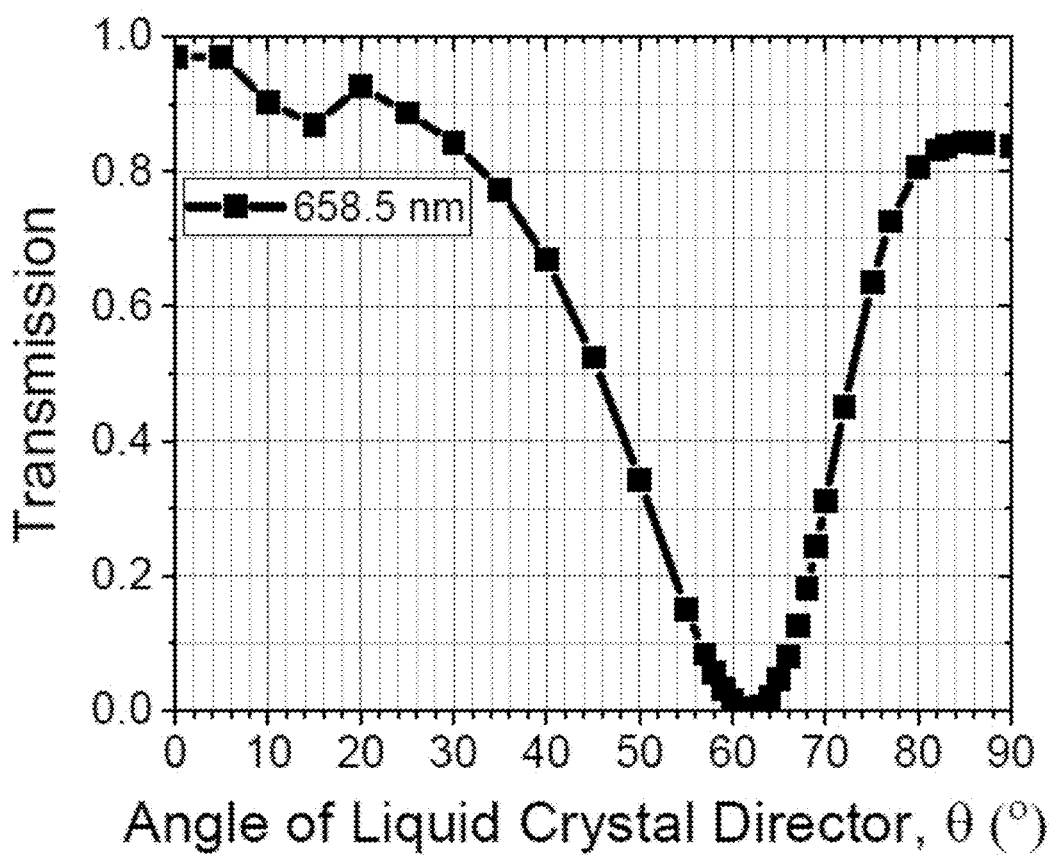
FIG. 11A is a plot of transmission as a function of the polar angle θ of the liquid crystal directors showing the dependence of the transmission due to orientation of the liquid crystals of the modulator according to various embodiments.
Figure 11B:
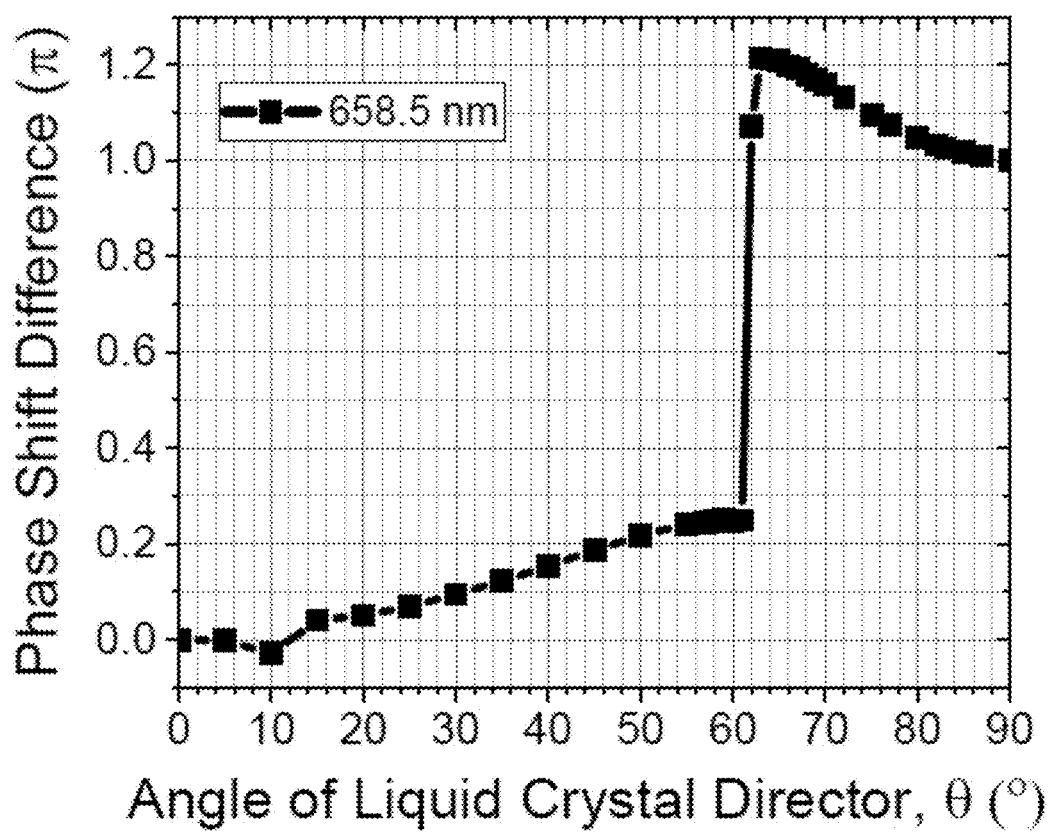
FIG. 11B is a plot of phase shift difference (in π radians) as a function of the polar angle θ of the liquid crystal directors showing the dependence of the phase shift difference due to orientation of the liquid crystals of the modulator according to various embodiments. The phase shift difference may be calculated with respect to the 0-0 state.

FIGS. 11A-B show the dependence of the simulated transmission and phase shift difference due to the angle θ of LC director with a fixed azimuthal angle φ=0° at the operation wavelength of 658.5 nm. FIG. 11A is a plot of transmission as a function of the polar angle θ of the liquid crystal directors showing the dependence of the transmission due to orientation of the liquid crystals of the modulator according to various embodiments. FIG. 11B is a plot of phase shift difference (in π radians) as a function of the polar angle θ of the liquid crystal directors showing the dependence of the phase shift difference due to orientation of the liquid crystals of the modulator according to various embodiments. The phase shift difference may be calculated with respect to the 0-0 state. The azimuthal angle φ may be fixed at 0° and the wavelength may be fixed at 658.5 nm. The thickness of the LC layer may be set at h=0.5 μm. The height (H) of the nanoantennas is fixed at 195 nm and the radius (R) is fixed at 135 nm. The period (P) of the nanoantennas may be fixed at 360 nm.

It is shown that a phase shift difference of 1π may be achievable by switching the liquid crystal from the state in the range from 90-0 to 80-0 to the state in the range from 0-0 to 10-0, while maintaining a high transmission of >80%. This may enable high-efficiency binary phase-only modulation of light with a phase of 0 or 1 π.

The phase retardation caused by switching a liquid crystal layer alone (i.e. without nanoantennas) with a thickness of 500 nm from the 90-0 state to the 0-0 state (providing the maximum anisotropy) may only be of 0.15 π at λ=658.5 nm. This illustrates the critical role played by the nanoantennas without which such a phase modulation may not be possible for this LC thickness.

Various embodiments may enable the fabrication of new transmissive binary-phase-only spatial light modulator (SLM) devices, in which pixels operate at 'ON' state with a phase of 0 π or at 'OFF' state with a phase of 1 π with a high transmission (>80%). The LC layer thickness in the modulator according to various embodiments may be much thinner than any conventional reported system. The reduction of the thickness may be enabled by the fact that the phase modulation imparted in the incident electromagnetic wave stems from the spectral shift in the nanoantenna resonance wavelength upon LC re-orientation. This is different from the usual mechanism used in conventional LC-based SLMs, in which the phase is modulated upon wave propagation inside the LC medium, and thus requires a larger LC thickness (for a transmissive device working under ideal conditions and based on the same E7 LC, the required thickness to achieve 1 π phase modulation at 658.5 nm would be around 1.65 um). The reduction of the thickness of the LC layer, as described above, may enable a significant reduction of the voltage needed to switch the device between the "OFF" and "ON" states by changing the LC orientation. This, in turn, may enable the increase in the speed of the device as well as a significant reduction of the cross-talk between the neighbouring pixels in the device that, ultimately, may translate to the possibility to reduce the minimum lateral size of the pixels and the pixel pitch between them.

The pixel size may be scalable from 0.36 μm up to, e.g., 1.8 μm and beyond simply by increasing the number of $TiO_2$ nanoantennas from 1×1 to, e.g., 5×5 as shown in FIG. 6. The pixel pitch may also be adjustable by including a gap between the adjacent pixels, as shown schematically in FIGS. 7A-B. A driving circuit compatible with the conventional TFT-driven liquid crystal displays (LCDs) may be deployed to electrically address the nanoantenna-based pixels of the LC-SLM device.

Further reduction of the LC thickness in the binary-phase modulation SLM as described herein may be possible, as further illustrated below. Nevertheless, this reduction, which may be beneficial for certain applications requiring very low levels of applied voltages, and thus very low power consumption, may impact the transmission values of the device, which may be reduced.

In various embodiments, the thickness of the LC layer may be set to 300 nm in the same configuration as described in FIGS. 3A-B. Each pixel of the device may include a single $TiO_2$ nanoantenna with a cylindrical shape, or multiple nanoantennas, e.g. 3×3 nanoantennas.

The nanoantenna height (H) may be fixed at 195 nm, and the period (P) between the nanoantennas in the device may be 360 nm. The nanoantenna geometrical parameter leading to the realization of the Huygens' condition may be determined using a similar method as described above. The transmission spectra of several devices with nanoantennas having different radii may be analyzed.

Figure 12A:
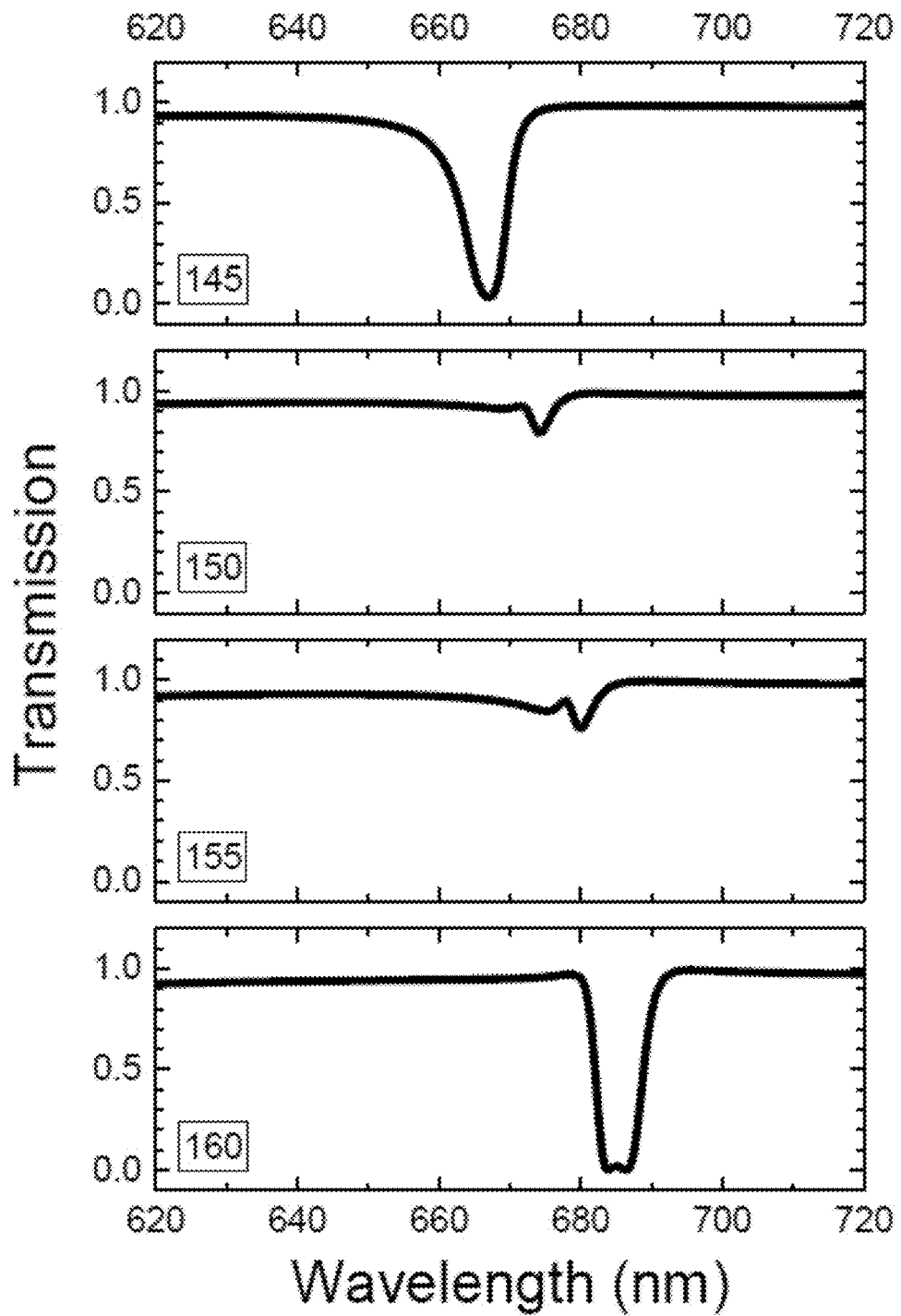
FIG. 12A is a plot of transmission as a function of wavelength (in nanometers or nm) showing the simulated transmission amplitude of waves at different wavelengths in the spatial light modulator according to various embodiments when the radius (R) of the cylindrical nanoantennas are varied from 145 nm to 160 nm.
Figure 12B:
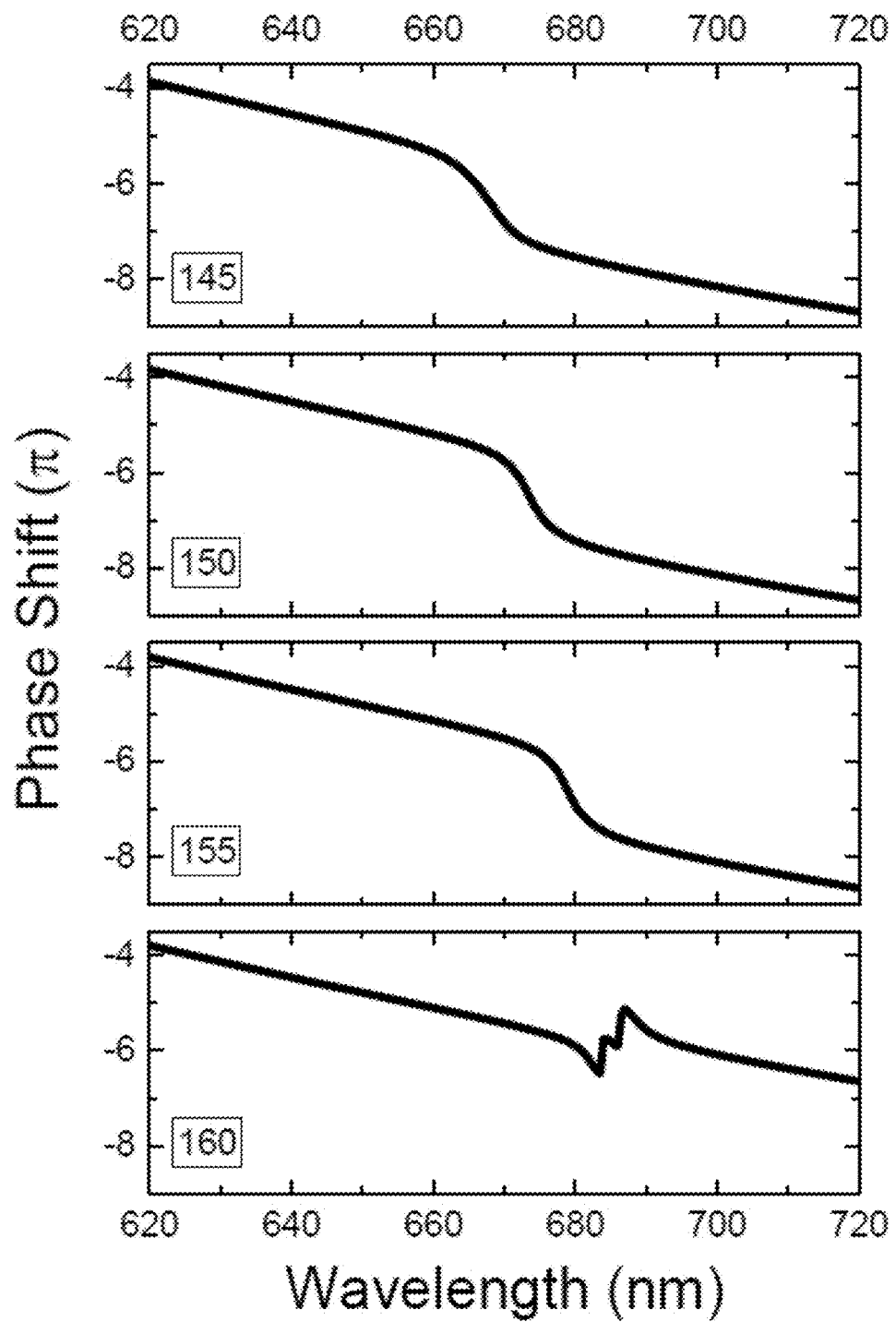
FIG. 12B is a plot of phase shift (in π radians) as a function of wavelength (in nanometers or nm) showing the simulated transmission phase of waves at different wavelengths in the spatial light modulator according to various embodiments when the radius (R) of the cylindrical nanoantennas are varied from 145 nm to 160 nm.

FIG. 12A is a plot of transmission as a function of wavelength (in nanometers or nm) showing the simulated transmission amplitude of waves at different wavelengths in the spatial light modulator according to various embodiments when the radius (R) of the cylindrical nanoantennas are varied from 145 nm to 160 nm. FIG. 12B is a plot of phase shift (in π radians) as a function of wavelength (in nanometers or nm) showing the simulated transmission phase of waves at different wavelengths in the spatial light modulator according to various embodiments when the radius (R) of the cylindrical nanoantennas are varied from 145 nm to 160 nm.

FIGS. 12A-B shows the simulated transmission and phase shift of a plane wave transmitted through the device as a function of wavelength in which the radius (R) of the nanoantenna in each pixel is varied from 145 nm to 160 nm and the device is in the "OFF" state, i.e., when the orientation of the LC director is set as θ=90° and φ=0°.

From the results, it can be seen that the nanoantenna radius leading to the realization of the Huygens' condition is R=150 nm (manifested itself as an increase in the transmission and 2 π phase shift around the resonances at 674 nm).

By reorientating of the LC directors of the liquid crystals in the device, the phase of the transmitted light may be modulated in a binary fashion (phase being 0 or 1 π) while keeping a high transmission (>80%).

Figure 13A:
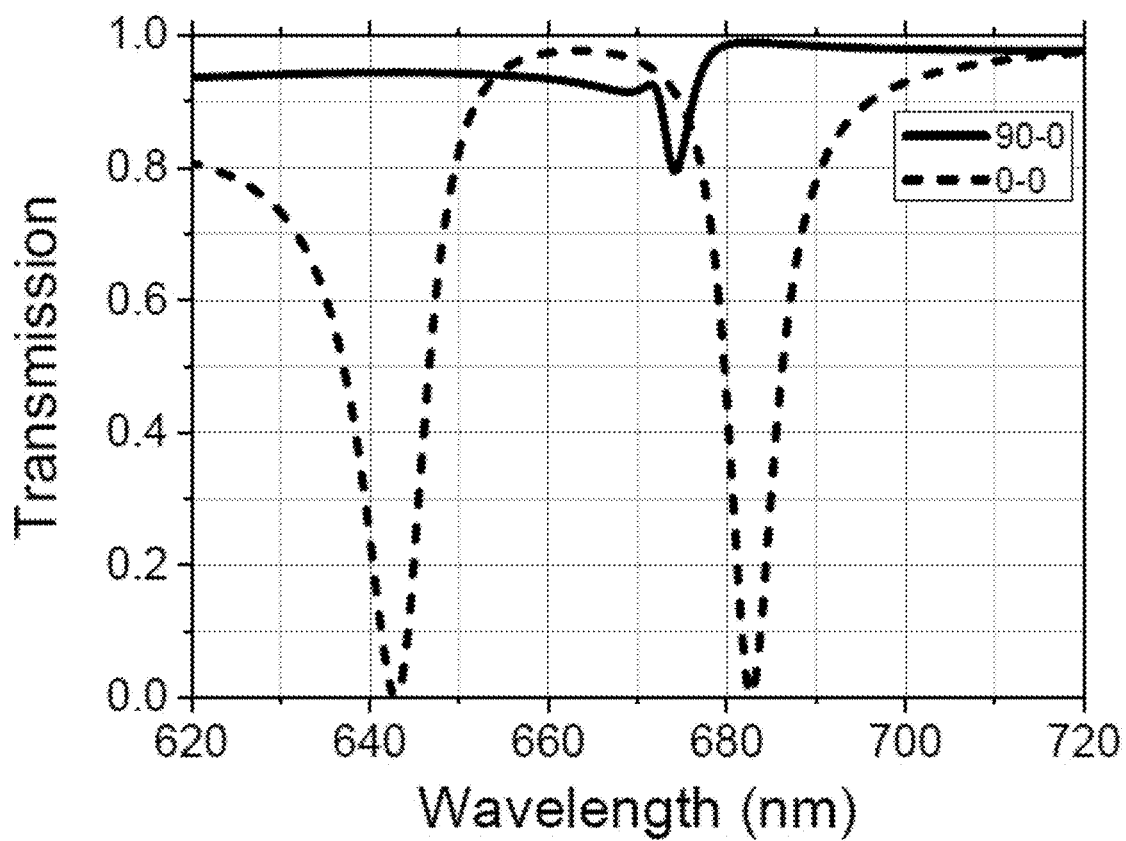
FIG. 13A is a plot of transmission as a function of wavelength (in nanometers or nm) showing the simulated transmission amplitude changes in the spectrum when the liquid crystals of the device according to various embodiments are switched from the 90-0 state to the 0-0 state.
Figure 13B:
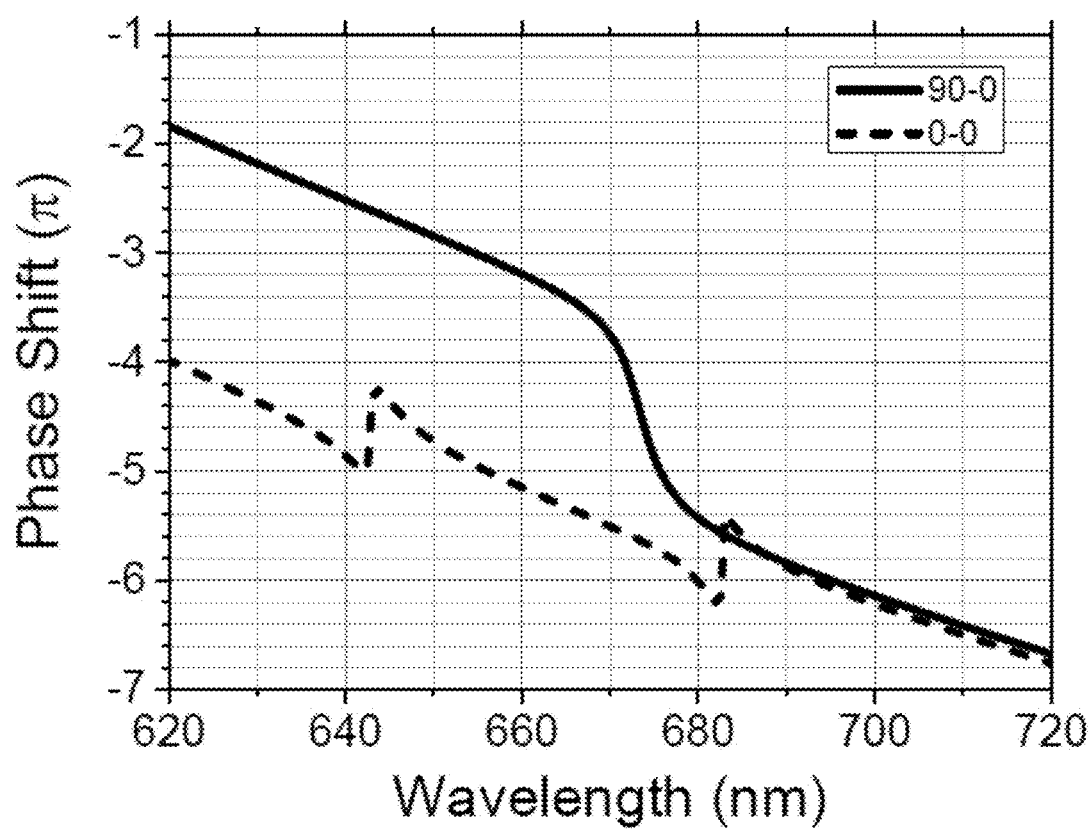
FIG. 13B is a plot of phase shift (in π radians) as a function of wavelength (in nanometers or nm) showing the simulated transmission phase changes in the spectrum when the liquid crystals of the device according to various embodiments are switched from the 90-0 state to the 0-0 state.

FIG. 13A is a plot of transmission as a function of wavelength (in nanometers or nm) showing the simulated transmission amplitude showing the changes in the spectrum when the liquid crystals of the device according to various embodiments are switched from the 90-0 state to the 0-0 state. FIG. 13B is a plot of phase shift (in π radians) as a function of wavelength (in nanometers or nm) showing the simulated transmission phase showing the changes in the spectrum when the liquid crystals of the device according to various embodiments are switched from the 90-0 state to the 0-0 state.

At the 90-0 state, the LC director may be orientated such that θ=90°, φ=0°. At the 0-0 state, the LC director may be orientated such that θ=0°, φ=0°. The thickness of the LC layer may be set at h=0.3 μm. The height (H) of the nanoantennas is fixed at 195 nm and the radius (R) is fixed at 150 nm to meet the high-transmission Huygens' condition for the 90-0 LC state. The period (P) of the nanoantennas may be fixed at 360 nm.

Figure 14A:
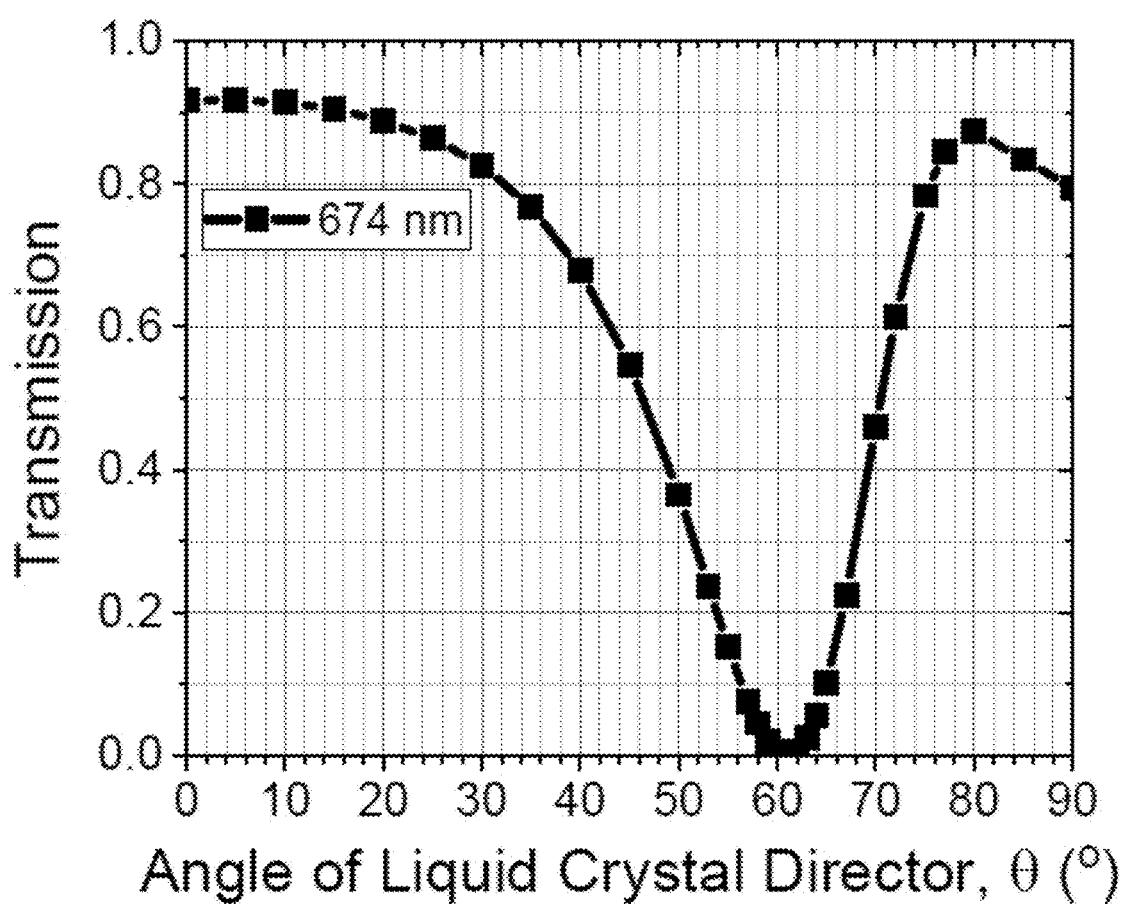
FIG. 14A is a plot of transmission as a function of the polar angle θ of the liquid crystal directors showing the dependence of the transmission due to orientation of the liquid crystals of the modulator according to various embodiments.
Figure 14B:
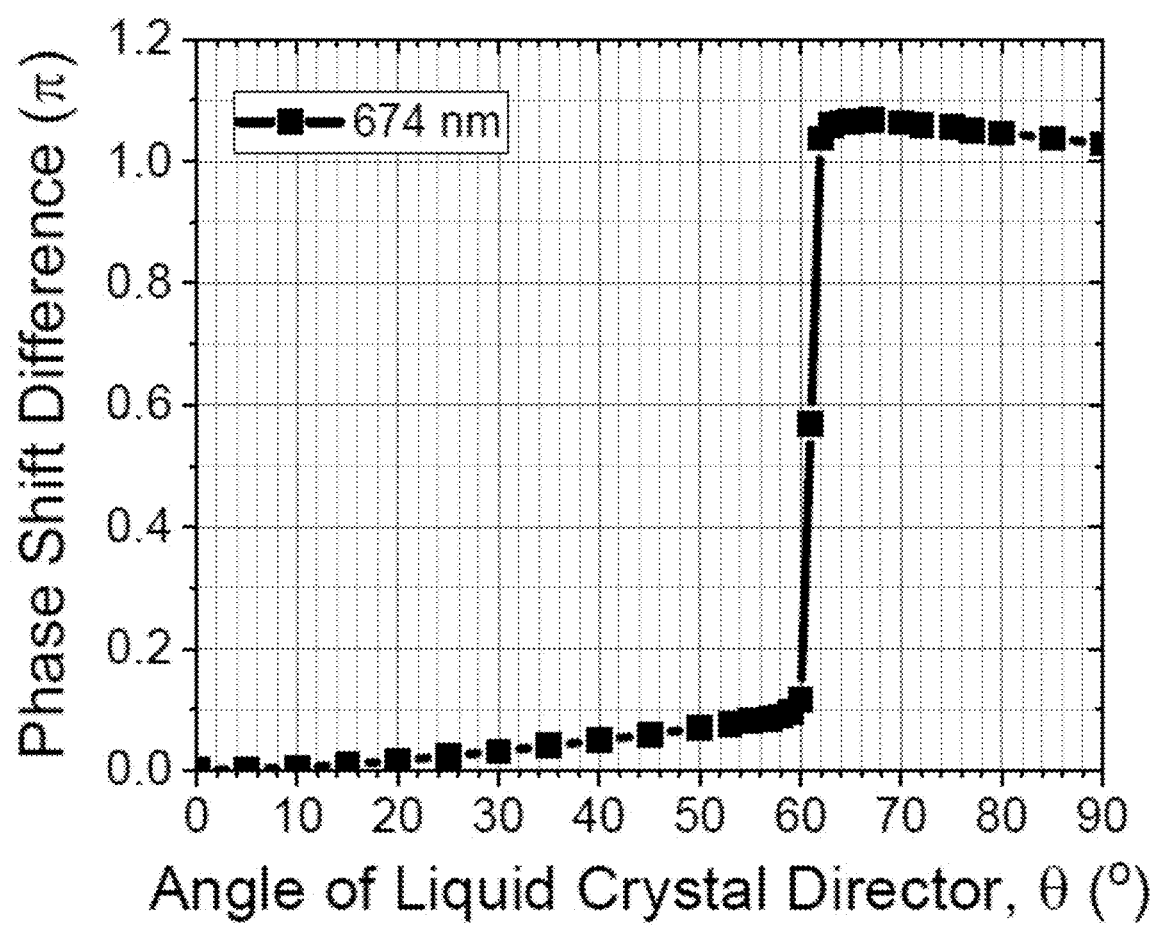
FIG. 14B is a plot of phase shift difference (in π radians) as a function of the polar angle θ of the liquid crystal directors showing the dependence of the phase shift difference due to orientation of the liquid crystals of the modulator according to various embodiments. The phase shift difference may be calculated with respect to the 0-0 state.

FIG. 14A is a plot of transmission as a function of the polar angle θ of the liquid crystal directors showing the dependence of the transmission due to orientation of the liquid crystals of the modulator according to various embodiments. FIG. 14B is a plot of phase shift difference (in π radians) as a function of the polar angle θ of the liquid crystal directors showing the dependence of the phase shift difference due to orientation of the liquid crystals of the modulator according to various embodiments. The phase shift difference may be calculated with respect to the 0-0 state. The azimuthal angle φ may be fixed at 0° and the wavelength may be fixed at 674 nm. The thickness of the LC layer may be set at h=0.3 μm. The height (H) of the nanoantennas is fixed at 195 nm and the radius (R) is fixed at 150 nm. The period (P) of the nanoantennas may be fixed at 360 nm.

FIGS. 14A-B show that a phase shift difference of 1 π may be achievable by switching the liquid crystals from the state in the range from 90-0 to 75-0 to the state in the range from 0-0 to 30-0, while maintaining a high transmission of >80%. This may enable high-efficiency binary phase-only modulation of light with a phase of 0 or 1 π. While the transmission may be slightly lower than for the case with LC thickness of 500 nm, transmission levels of >80% may still be possible.

Ultrathin Amplitude-Only Spatial Light Modulation

Various embodiments may relate to amplitude modulation SLMs. Various embodiments may relate to modulators with nanoantenna height H=195 nm, nanoantenna period P=360 nm.

In various embodiments, the nanoantenna radius (R) may be 135 nm and the LC thickness (h) may be 500 nm, with an operating wavelength of 658.5 nm.

In various other embodiments, the nanoantenna radius (R) may be 150 nm and the LC thickness (h) may be 300 nm, with an operating wavelength of 674 nm. According to FIG. 11A and FIG. 14A, if the LC in the device is tuned from the 0-0 state to the 62-0 state and 61-0 state respectively, the transmission through the device can be continuously modulated from 97% to 0% in various embodiments and from 91.7% to 0% in various other embodiments.

In amplitude-modulation SLMs, however, it is desirable to uncouple, as much as possible, the amplitude modulation from any phase modulation. As can be seen in FIG. 11B and FIG. 14B, the phase retardation caused by the switching of the liquid crystal director from 0-0 state to 60-0 state (i.e., from maximum transmission to minimum transmission) may slightly decrease with the decrease of the LC thickness (h).

In various embodiments, the thickness of the liquid crystal layer may be equal to the nanoantenna height, h=H, in order to achieve an ultrathin, amplitude-only spatial light modulation that maximally uncouples the transmission modulation from any phase modulation.

The modulator may include an array of nanoantennas similar to that represented in FIGS. 3A-B. The nanoantennas may be cylindrical with circular cross sections, may be made of $TiO_2$, and may have a height (H) of 195 nm. As stated above, the LC thickness (h) may be fixed at 195 nm, coinciding with the nanoantenna height. The period (P) of the nanoantennas may be 360 nm.

Figure 15A:
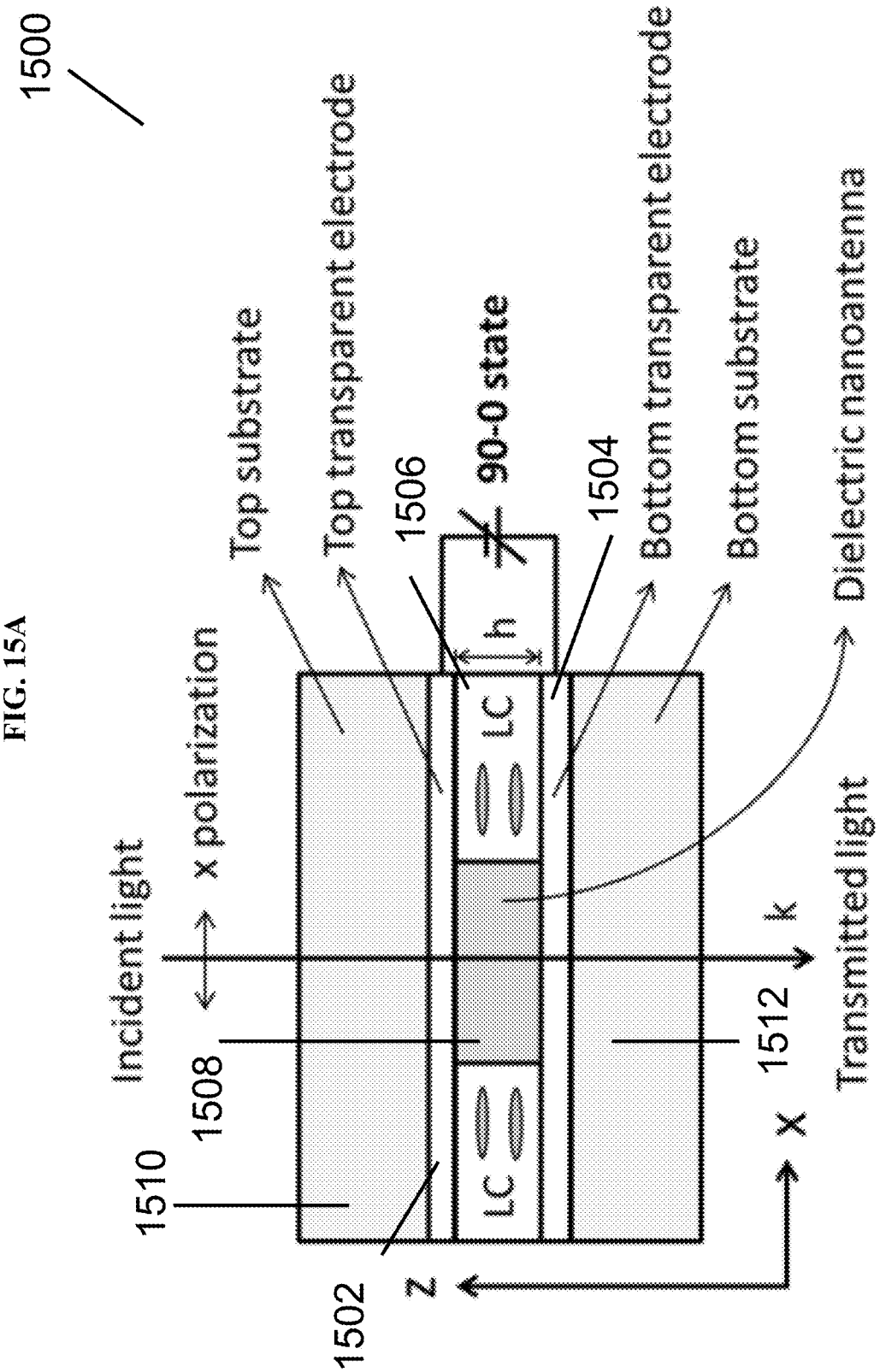
FIG. 15A is a side cross-sectional schematic of a spatial light modulator for continuous amplitude-only light modulation according to various embodiments at a 90-0 state.
Figure 15B:
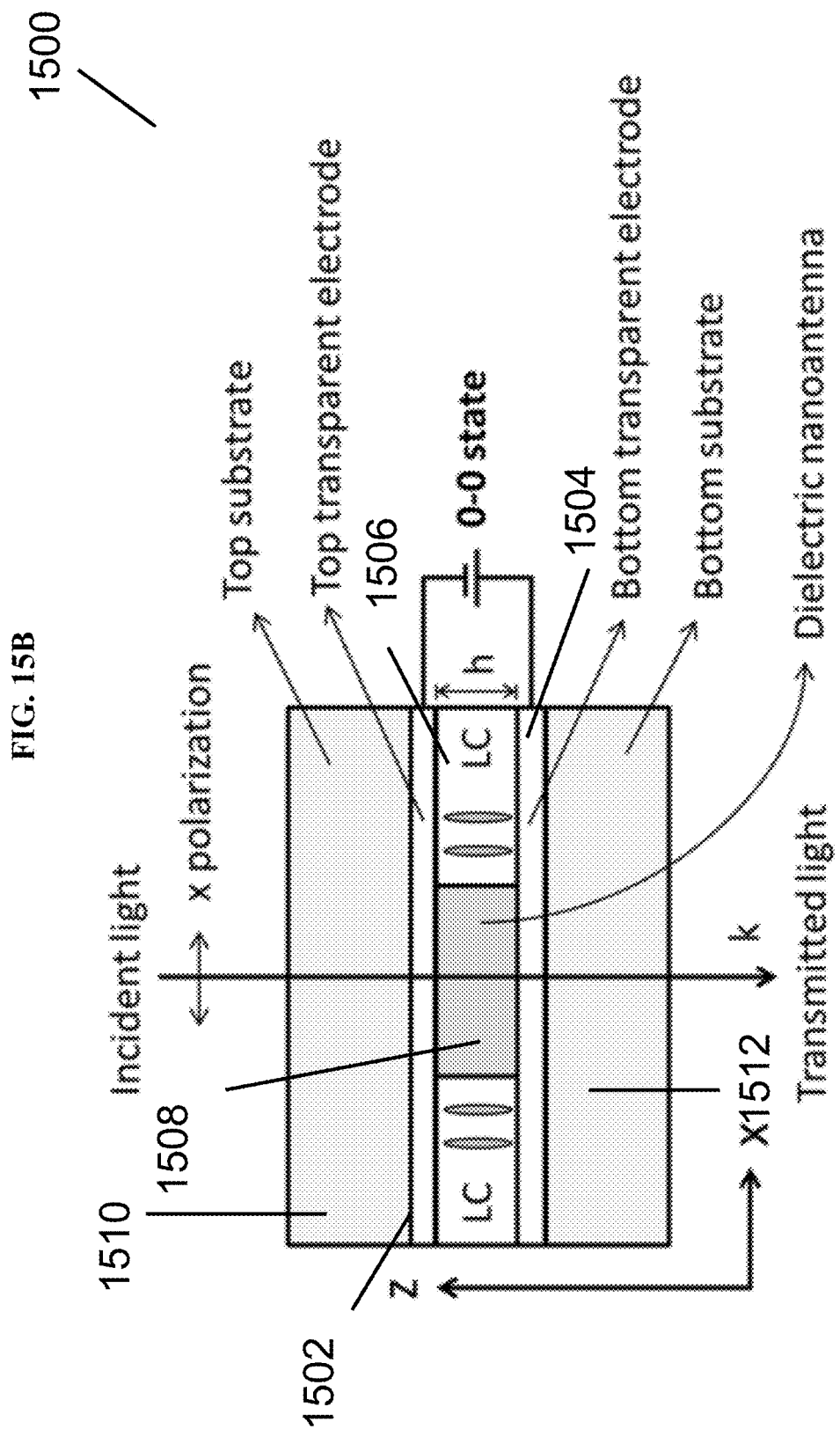
FIG. 15B is a side cross-sectional schematic of the spatial light modulator shown in FIG. 15A according to various embodiments in a 0-0 state.

FIG. 15A is a side cross-sectional schematic of a spatial light modulator 1500 for continuous amplitude-only light modulation according to various embodiments at a 90-0 state. FIG. 15B is a side cross-sectional schematic of the spatial light modulator 1500 shown in FIG. 15A according to various embodiments in a 0-0 state.

The spatial light modulator 1500 may include a first electrode arrangement 1502. The spatial light modulator 1500 may also include a second electrode arrangement 1504. The spatial light modulator 1500 may additionally include a liquid crystal (LC) layer 1506 between the first electrode arrangement 1502 and the second electrode arrangement 1504. The spatial light modulator 1500 may also include a dielectric or semiconductor nanoantenna 1508 in contact with the liquid crystal layer 1506. The first electrode arrangement 1502 and the second electrode 1504 arrangement may be each configured to allow at least a portion of light to pass through. The spatial light modulator 1500 may include a first substrate 1510 in contact with the first electrode arrangement 1502, and a second substrate 1512 in contact with the second electrode arrangement 1504. A height of the nanoantenna 1508 may be equal to a thickness of the liquid crystal layer.

Figure 16A:
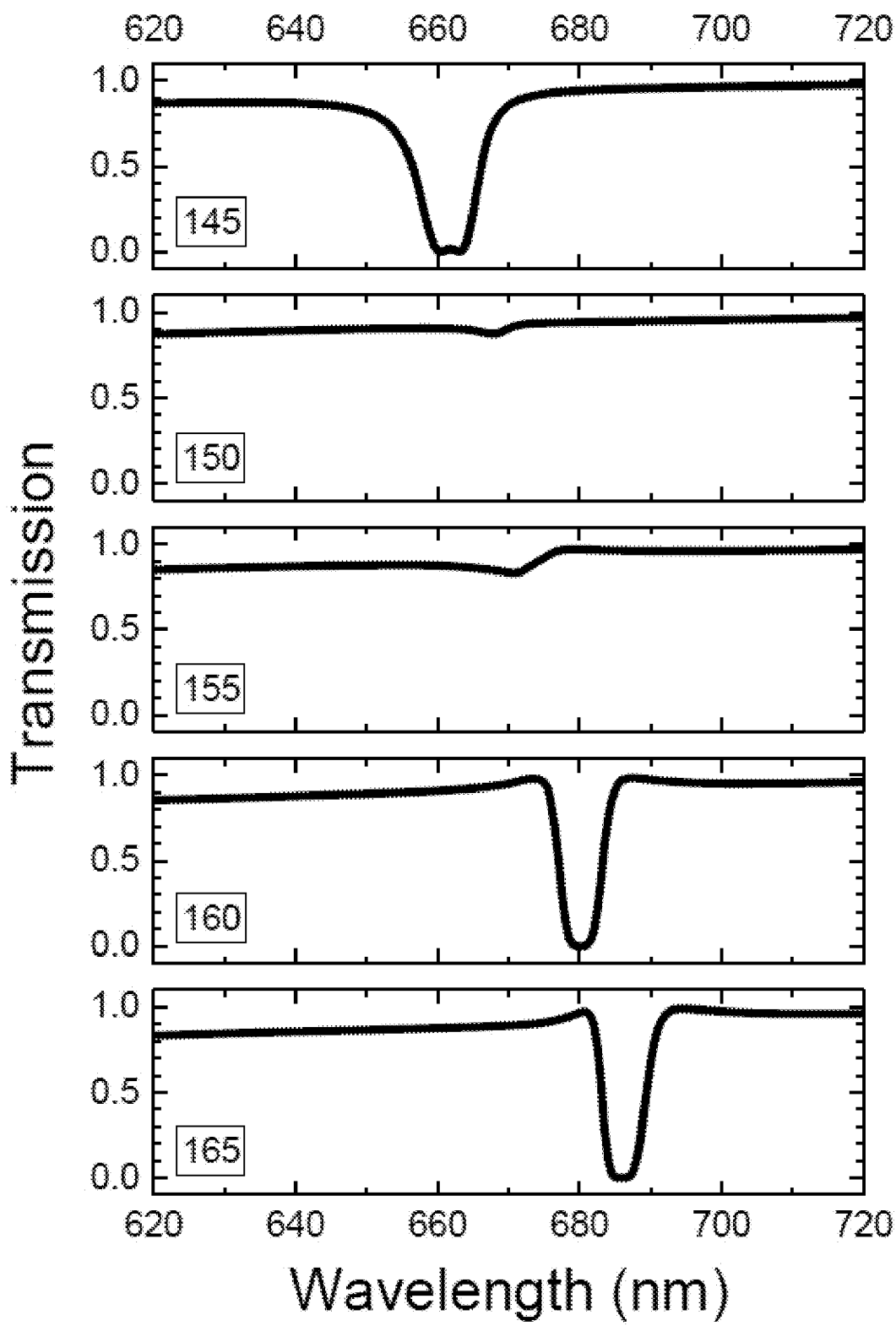
FIG. 16A is a plot of transmission as a function of wavelength (in nanometers or nm) showing the simulated transmission amplitude of waves at different wavelengths in the spatial light modulator according to various embodiments when the radius (R) of the cylindrical nanoantenna is varied from 145 nm to 165 nm.
Figure 16B:
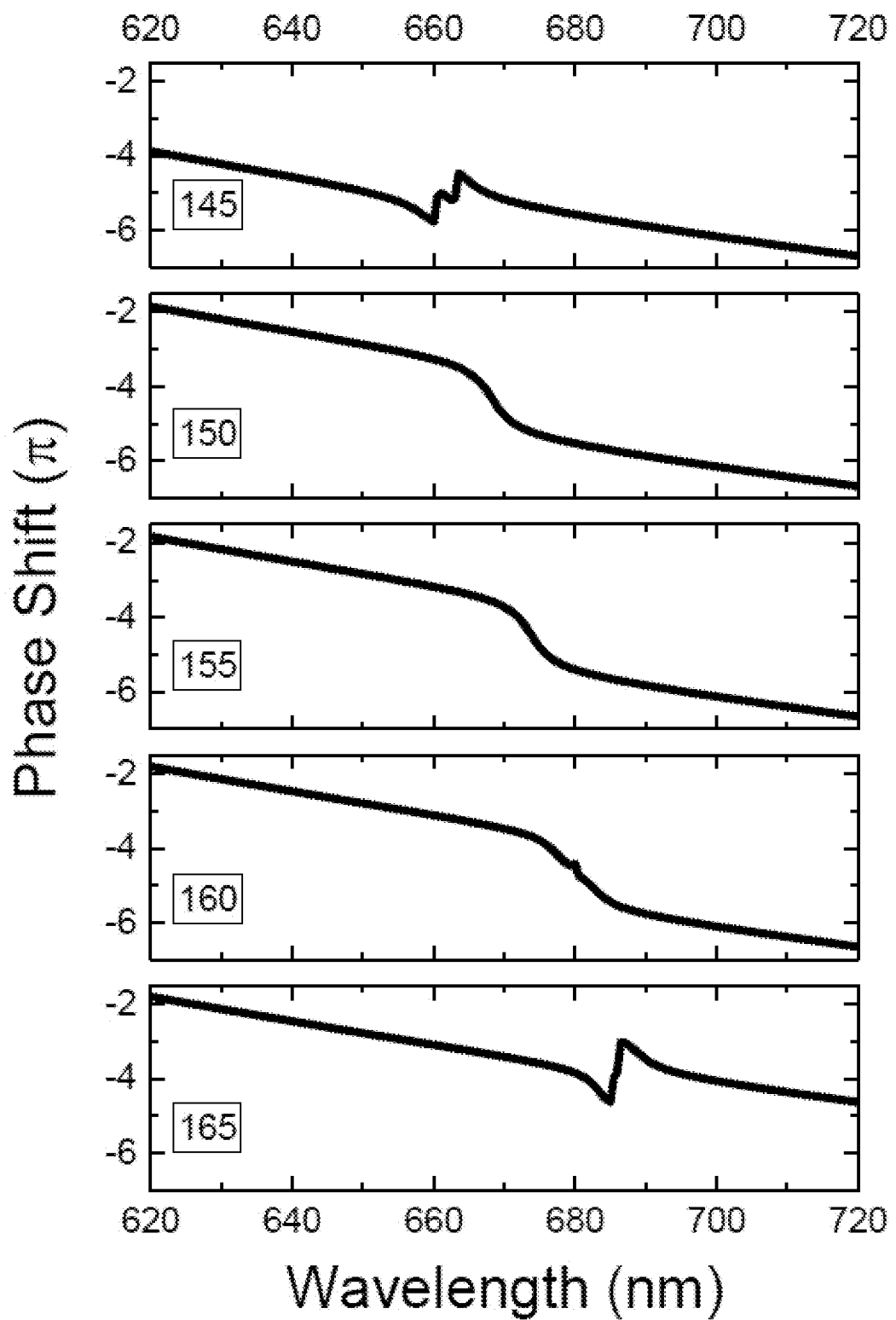
FIG. 16B is a plot of phase shift (in π radians) as a function of wavelength (in nanometers or nm) showing the simulated transmission phase of waves at different wavelengths in the spatial light modulator according to various embodiments when the radius (R) of the cylindrical nanoantenna is varied from 145 nm to 165 nm.

FIG. 16A is a plot of transmission as a function of wavelength (in nanometers or nm) showing the simulated transmission amplitude of waves at different wavelengths in the spatial light modulator according to various embodiments when the radius (R) of the cylindrical nanoantenna is varied from 145 nm to 165 nm. FIG. 16B is a plot of phase shift (in π radians) as a function of wavelength (in nanometers or nm) showing the simulated transmission phase of waves at different wavelengths in the spatial light modulator according to various embodiments when the radius (R) of the cylindrical nanoantenna is varied from 145 nm to 165 nm. The height (H) of the nanoantenna is fixed at 195 nm, and the period (P) of the nanoantenna is fixed at 360 nm. The orientation of the LC director may be set at θ=90° and φ=0°. The thickness of the LC layer may be set at h=0.195 μm, coinciding with the height of the nanoantenna.

FIGS. 16A-B demonstrate that for the 90-0 state with the LC thickness h=0.195 μm, the Huygens condition may be met by setting the radius of the nanoantenna at R=150 nm, in which a high transmission of >85% and a phase shift of 2 π may be achieved around the wavelength of 668 nm.

Figure 17A:
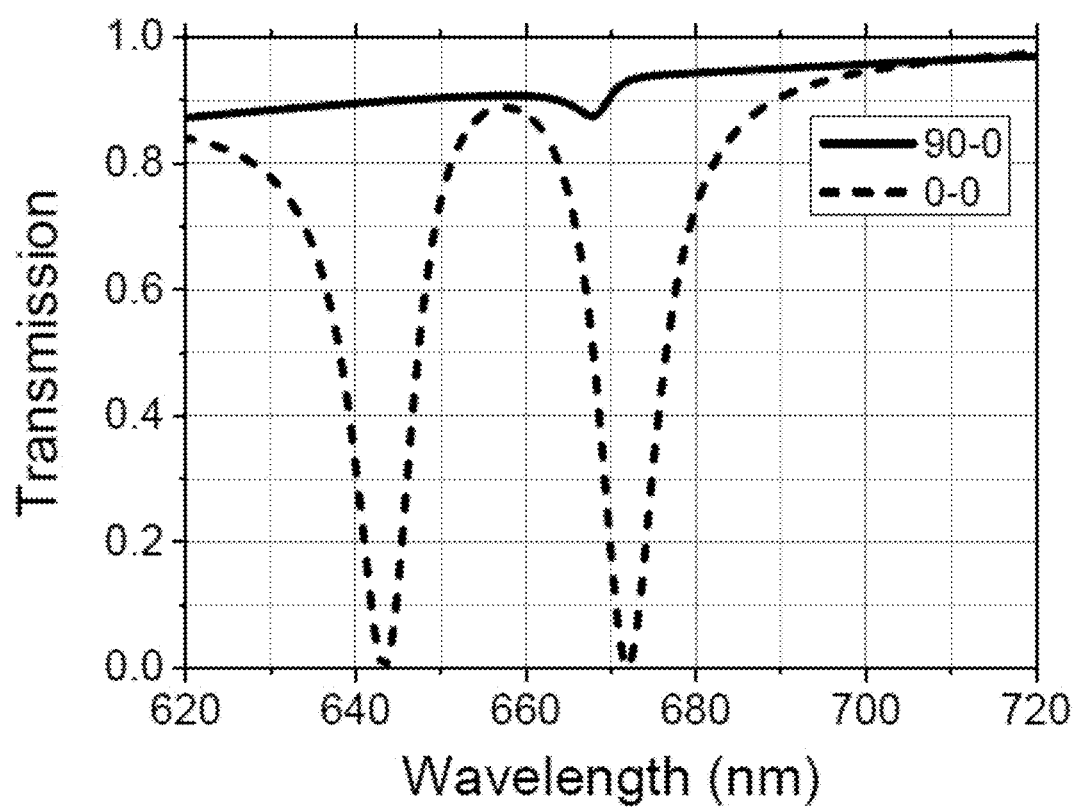
FIG. 17A is a plot of transmission as a function of wavelength (in nanometers or nm) showing the simulated transmission amplitude changes in the spectrum when the liquid crystals of the device according to various embodiments are switched from the 90-0 state to the 0-0 state.
Figure 17B:
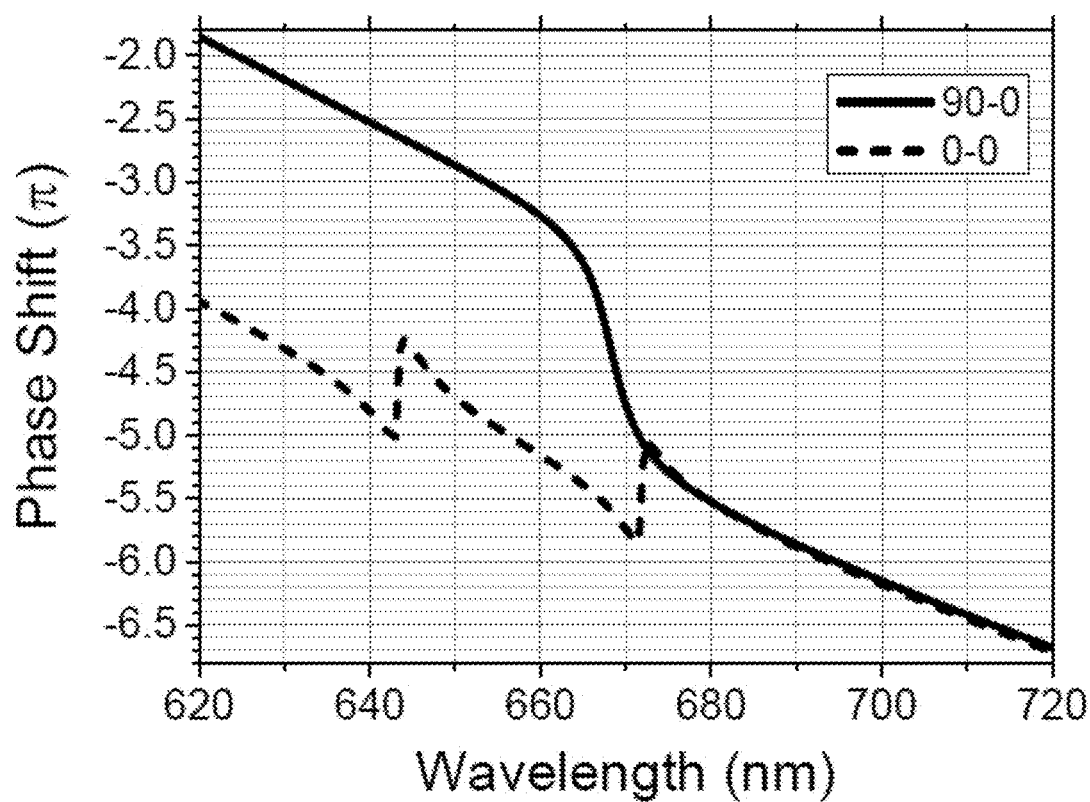
FIG. 17B is a plot of phase shift (in π radians) as a function of wavelength (in nanometers or nm) showing the simulated transmission phase changes in the spectrum when the liquid crystals of the device according to various embodiments are switched from the 90-0 state to the 0-0 state.

FIG. 17A is a plot of transmission as a function of wavelength (in nanometers or nm) showing the simulated transmission amplitude showing the changes in the spectrum when the liquid crystals of the device according to various embodiments are switched from the 90-0 state to the 0-0 state. FIG. 17B is a plot of phase shift (in π radians) as a function of wavelength (in nanometers or nm) showing the simulated transmission phase showing the changes in the spectrum when the liquid crystals of the device according to various embodiments are switched from the 90-0 state to the 0-0 state.

At the 90-0 state, the LC director may be orientated such that θ=90°, φ=0°. At the 0-0 state, the LC director may be orientated such that θ=0°, φ=0°. The radius (R) is fixed at 150 nm to meet the high-transmission Huygens' condition for the 90-0 LC state. The period (P) of the nanoantennas may be fixed at 360 nm.

It may be noted that, in this configuration, the phase retardation induced by the LC alone (which can be identified as the phase difference between the 90-0 and the 0-0 states spectrally away from the resonances) may be very small (e.g. it is around 0.029 π at 700 nm). It may also be noticed that, upon the reorientation of the LC director from 90-0 state to 0-0 state, the phase of the transmitted light can be modulated by 1 π around the wavelength of 670 nm, but the transmission at the same operating wavelength may be strongly modulated from 90% to 18%, which is not suitable for binary phase-only spatial light modulation applications.

Figure 18A:
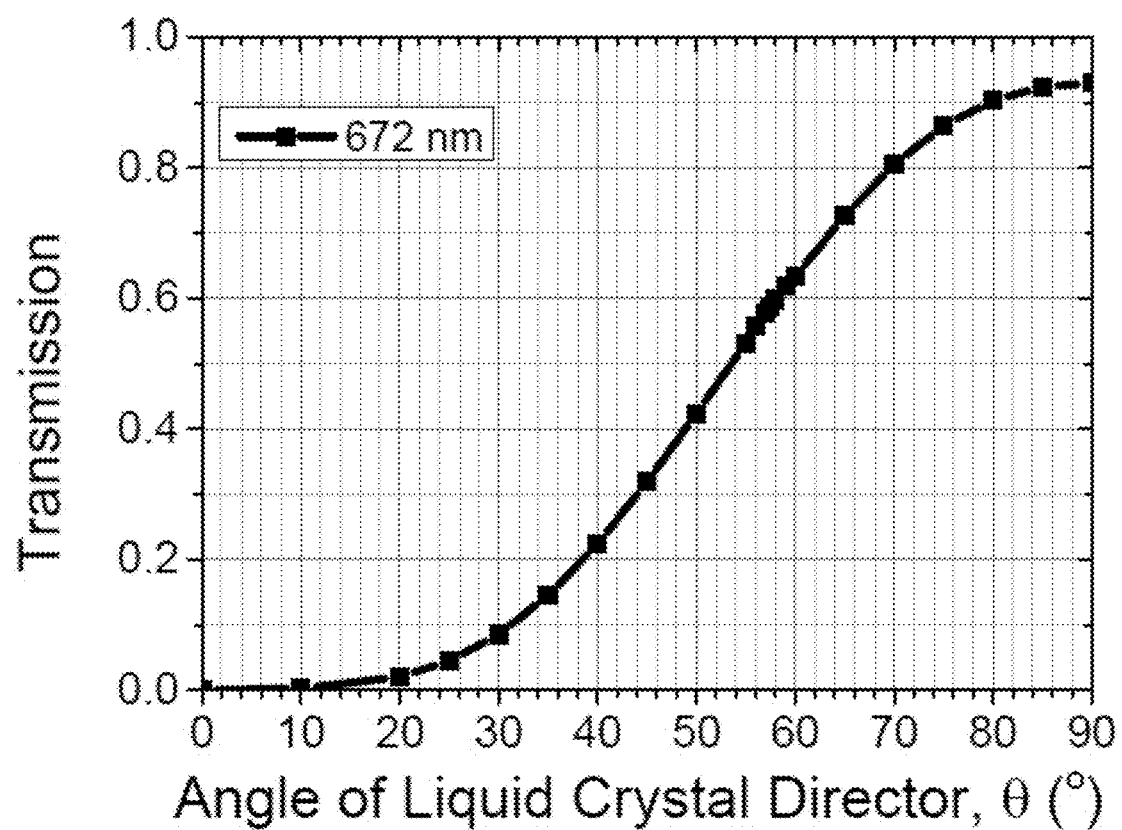
FIG. 18A is a plot of transmission as a function of the polar angle θ of the liquid crystal directors showing the dependence of the transmission due to orientation of the liquid crystals of the modulator according to various embodiments.
Figure 18B:
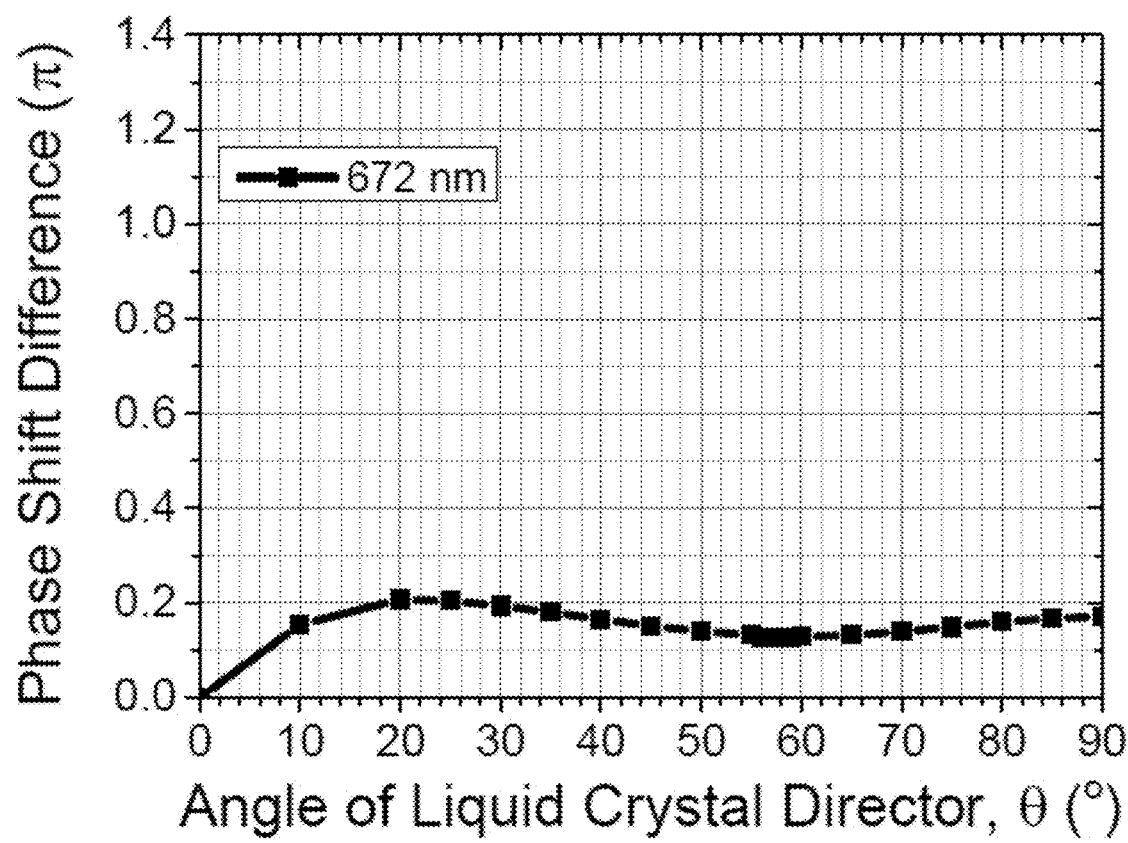
FIG. 18B is a plot of phase shift difference (in π radians) as a function of the polar angle θ of the liquid crystal directors showing the dependence of the phase shift difference due to orientation of the liquid crystals of the modulator according to various embodiments. The phase shift difference may be calculated with respect to the 0-0 state.

FIG. 18A is a plot of transmission as a function of the polar angle θ of the liquid crystal directors showing the dependence of the transmission due to orientation of the liquid crystals of the modulator according to various embodiments. FIG. 18B is a plot of phase shift difference (in π radians) as a function of the polar angle θ of the liquid crystal directors showing the dependence of the phase shift difference due to orientation of the liquid crystals of the modulator according to various embodiments. The phase shift difference may be calculated with respect to the 0-0 state. The azimuthal angle φ may be fixed at 0° and the wavelength may be fixed at 672 nm. The radius (R) is fixed at 150 nm to meet the high-transmission Huygens' condition for the 90-0 LC state. At the operation wavelength (λ) of 672 nm, the transmission may be modulated from 93% to 0% by tuning the angle of liquid crystal director from θ=90° to θ=10° with a phase variance as small as <0.06 π.

Various embodiments may enable an ultrathin spatial light modulator for amplitude-only light modulation applications. The ultra-thin character of the proposed SLM may have an impact by reducing the voltage needed to operate the device, as compared to state of the art.

This, in turn, may enable a power consumption reduction, as well as an increase in the switching speed of the device and a reduction in the cross-talk between pixels, which ultimately may allow a reduction of the minimum pixel size, as explained previously. Again, the pixel size of the proposed device may be scalable from 0.36 μm up to, e.g., 1.8 μm, and beyond simply by increasing the number of nanoantennas from 1×1 to, e.g., 5×5 as schematically shown in FIG. 6. The pixel pitch may also be adjustable by including a gap between the adjacent pixels, as shown schematically in FIGS. 7A-B. A driving circuit compatible with the conventional TFT-driven liquid crystal displays (LCDs) may be deployed to electrically address the nanoantenna-based pixels of the LC-SLM devices.

Various embodiments may combine the binary phase-only spatial light modulation and the continuous amplitude-only spatial light modulation into one single SLM device at the same operating wavelength.

The device may have a LC layer thickness h=0.5 μm in the same configuration as described in FIGS. 3A-B. Each pixel of the device may include a single TiO$_2$ nanoantenna with a cylindrical shape, or multiple nanoantennas, e.g. 3×3 nanoantennas. The parameters of the TiO$_2$ cylindrical nanoantennas are set as H=175 nm and R=130 nm in order to meet the high-transmission Huygens' condition for the 55-0 LC state. The period of the nanoantennas is set as P=360 nm.

Figure 19:
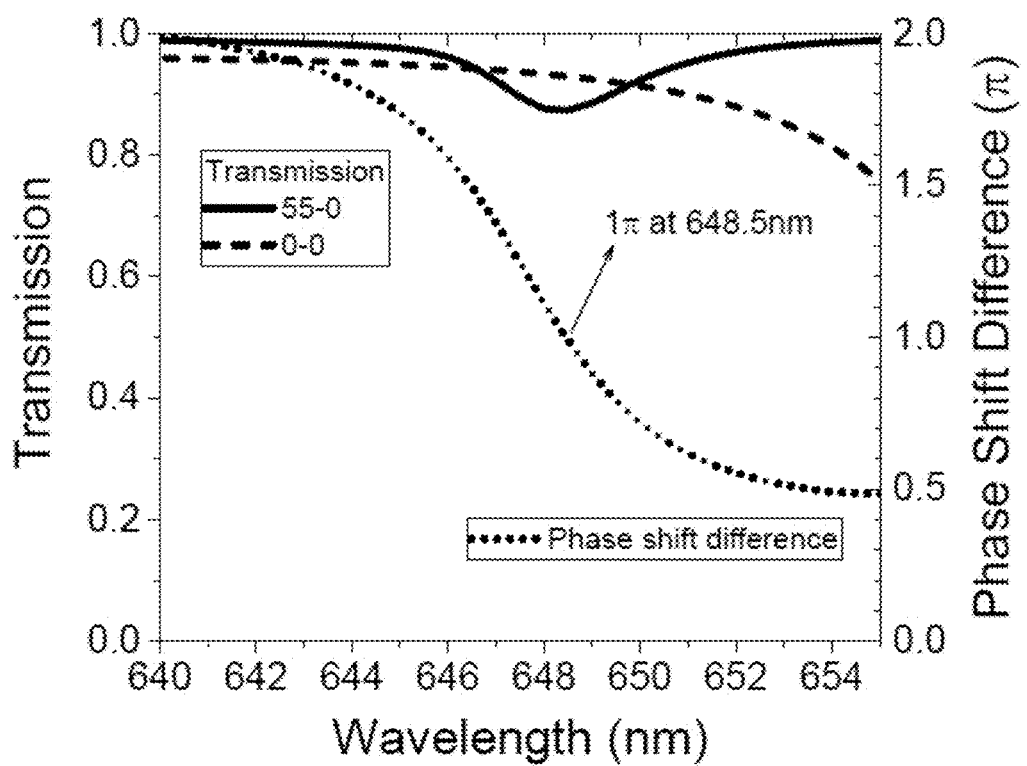
FIG. 19 is a plot of transmission/phase shift difference (in π radians) as a function of wavelength (in nanometers or nm) illustrating the simulated transmission and phase shift difference when the liquid crystals of the device according to various embodiments are switched from the 55-0 state to the 0-0 state. The phase shift difference may be calculated with respect to the 0-0 state.

FIG. 19 is a plot of transmission/phase shift difference (in π radians) as a function of wavelength (in nanometers or nm) illustrating the simulated transmission and phase shift difference when the liquid crystals of the device according to various embodiments are switched from the 55-0 state to the 0-0 state. The nanoantennas may be cylindrical with circular cross-sections. The LC thickness (h) may be set at 0.5 μm. The parameters of the TiO$_2$ cylindrical nanoantennas may be set as H=175 nm and R=130 nm in order to meet the high-transmission Huygens' condition for the 55-0 LC state. The period (P) of the nanoantennas may be 360 nm. FIG. 19 shows that by reorientation of the LC director in the device from the 55-0 state to 0-0 state, the phase of the transmitted light can be modulated in a binary fashion (phase being 0 or 1 π) while keeping a high transmission (>87%) at the wavelength of 648.5 nm.

Figure 20:
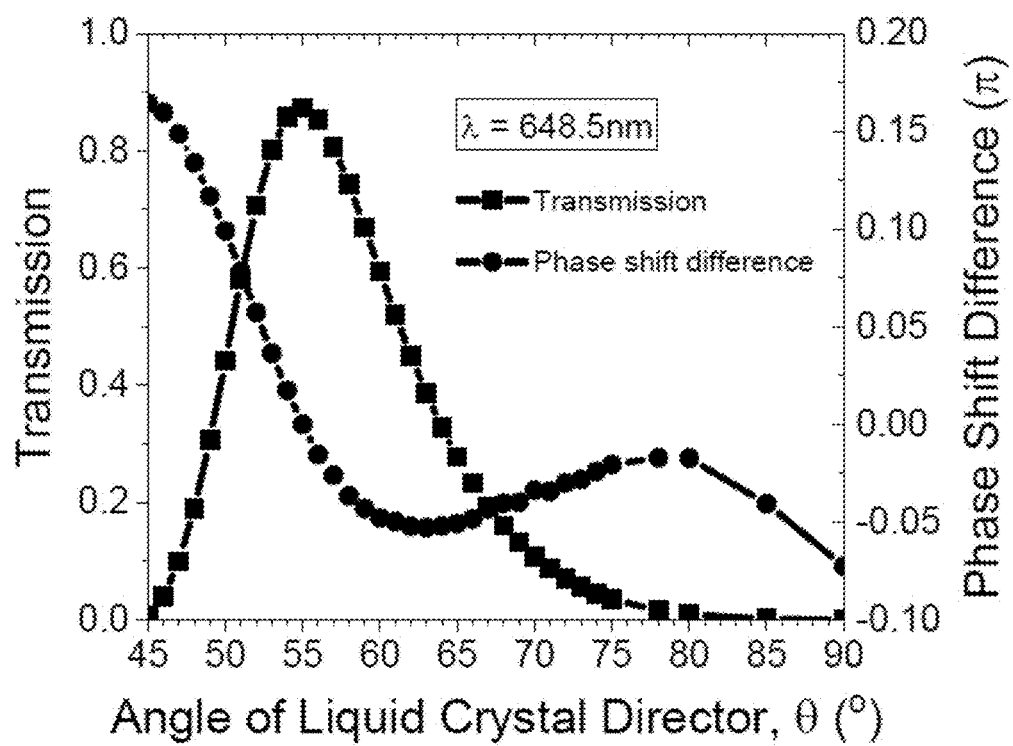
FIG. 20 is a plot of transmission/phase shift difference (in π radians) as a function of the polar angle θ of the liquid crystal directors illustrating the dependence of the simulated transmission and phase shift difference due to orientation of the liquid crystals of the device according to various embodiments. The phase shift difference may be calculated with respect to the 0-0 state.

FIG. 20 is a plot of transmission/phase shift difference (in π radians) as a function of the polar angle θ of the liquid crystal directors illustrating the dependence of the simulated transmission and phase shift difference due to orientation of the liquid crystals of the device according to various embodiments. The azimuthal angle (φ) may be fixed at 0°, and the operating wavelength may be fixed at 648.5 nm. The phase shift difference may be calculated with respect to the 55-0 state. The LC thickness may be set as h=0.5 μm. The parameters of the TiO$_2$ cylindrical nanoantennas may be set at H=175 nm and R=130 nm in order to meet the high-transmission Huygens' condition for the 55-0 LC state. The period (P) of the nanoantennas may be 360 nm. FIG. 20 shows that by tuning the liquid crystals from the 55-0 state to the 85-0 state, the transmission through the device may be continuously modulated from 87.3% to 0% with a phase variance as small as <0.06 π. The same device may be used to obtain the data in FIG. 19 and FIG. 20. Various embodiments may enable the amplitude-only spatial light modulation to be completely uncoupled from the phase modulation, and hence the amplitude and phase can be modulated simultaneously and independently with a single transmissive SLM.

Various embodiments may relate to a way to reduce the LC layer thickness of transmissive SLMs with the assistance of dielectric or semiconductor nanoantennas embedded in a uniaxial anisotropic LC for phase-only and amplitude-only spatial light modulation applications. It is expected that the reduction of LC thickness may result in an increase of the switching speed, a reduction of the driving voltage, a suppression of pixel crosstalk, and ultimately a reduction of the pixel pitch or pixel size of LC-SLM devices. Recently, sub-micron thin-film transistors (TFTs) have been demonstrated, which is an indispensable route to next-generation SLM devices with near 1 μm pixel pitch.

Nanoantennas are engineered particles with sizes below the wavelength of the incident light that allow control of the amplitude, phase and polarization of the scattered field. Recently, metasurfaces including arrays of such nanoantennas, have shown great potential in manipulation of the amplitude, phase and polarization of the optical wave front of a beam transmitting through or reflecting from them. 2D or 3D static images have been reconstructed from phase-only, amplitude-only or complex amplitude holograms by encoding/mapping their profiles into the properties of the nanoantennas forming the metasurface. At the same time, ultrathin optical metasurfaces with a phase gradient have also received a great attention for beam steering applications.

Metasurfaces including arrays of high-index dielectric or semiconductor nanoantennas promise very high efficiencies due to lower absorption losses and highly tailorable scattering properties. A particular case attracting significant attention is that of Huygens' metasurfaces which may provide a near-unity transmission and a control of 2 π phase at visible wavelengths. This may be achieved by engineering the nanoantennas forming the metasurface to support spectrally overlapping electric and magnetic dipole resonances with the same amplitudes and phases. Thermal or electrical tuning of liquid crystals (LCs) as embedding media has been reported as an attractive approach to achieve tunable dielectric metasurfaces for active optical devices. However, these designs reported the use of thick LC cells which, ultimately, would not solve some of the long standing problems of SLMs as described above. In order to address the issues facing thick LC cells, a refractive-index-variable layer has been proposed for a light modulation device including a dielectric antenna and a spatial light modulator including a nano-antenna electrode in several patents. Thin LC cells have also been recently proposed for reflective SLMs based on nanoantennas.

Various embodiments may relate to ultra-thin (≤0.5 micron) transmissive spatial light modulators (SLMs) assisted with dielectric or semiconductor nanoantennas embedded in uniaxial anisotropic liquid crystals (LCs) for both phase-only and amplitude-only modulations. Various embodiments may relate to high-transmission SLMs with a binary 0-π phase accumulation at visible wavelengths and a 0-93% continuous transmission tunability with constant associated phase. The described effects may be enabled by the ultra-thin nature of the LC cell, which additionally solves the issues related to thick cells described above.

Various embodiments may pave the way to manufacturing next-generation energy-saving, high speed and high-resolution ultra-thin SLMs with a sub-micron, or even sub-wavelength, pixel pitch for dynamic holographic displays and active beam shaping and steering applications.

Various embodiments may achieve ultra-thin, transmissive spatial light modulators based on dielectric or semiconductor nanoantennas configured to act as Huygens' sources (i.e. to present negligible reflection or backward scattering) embedded in uniaxial anisotropic liquid crystals (LCs)). In various embodiments, the modulator may be configured for two-phase-level-only spatial light modulation. In various other embodiments, the modulator may be configured for continuous-amplitude-only spatial light modulation.

Various embodiments may relate to electrically switchable spatial light modulators based on semiconductor or dielectric nanoantennas (e.g. $TiO_2$) embedded in ultra-thin (≤0.5 um) uniaxial anisotropic liquid crystals for binary phase-only spatial light modulation applications with a phase shift difference of 1π and a high transmission of >80%.

Various embodiments may relate to electrically tunable spatial light modulators based on dielectric nanoantennas (made of $TiO_2$ in a particular embodiment) embedded in ultra-thin (<0.5 um) uniaxial anisotropic liquid crystal layers for amplitude-only spatial light modulation applications with a transmission modulated from >90% to 0% and a small phase variance of <0.1 π. Various embodiments may relate to spatial light modulators for continuous amplitude-modulation only in which the LC cell has a thickness equal to the height of the nanoantennas (<0.2 um). Various embodiments may enable the amplitude and phase to be modulated simultaneously and independently using a single transmissive SLM. In various embodiments, the SLM may include an array of pixels, each containing a top transparent substrate and a bottom transparent substrate coated with a transparent conducting oxide (e.g. indium tin oxide (ITO)) thin film used as electrodes, with at least one nanostructure (e.g. $TiO_2$) placed either on the bottom or on the top electrode used to address each pixel, and uniaxial anisotropic liquid crystals sandwiched between the top and bottom substrates/electrodes. Electrical switching/tuning of the liquid crystal director may be realized by applying a certain voltage to the transparent electrodes. The top electrode or the bottom electrode may be a common electrode to all pixels in the device. The other electrode may be individually addressed, with a driving circuit compatible with that used in conventional liquid crystal displays, to drive a desired voltage to each particular pixel, enabling a significant reduction in liquid crystal thickness with the assistance of dielectric nanoantennas. The LC thickness can be reduced from traditional 3~5 μm to 0.2~0.5 μm (and even <0.2 um, only limited by the height of the nanoantennas). Even with such thin LC cells, the device may provide the phase retardations required for binary phase modulation applications. Decreasing the LC cell thickness may allow reducing the voltage needed to electrically tune/switch the liquid crystals. Various embodiments may enable an ultrathin device for amplitude-only transmissive spatial light modulation. In both cases the design may enable a small pixel size scalable in the range of 0.3~2 μm and beyond, which may be addressed with a driving circuit compatible with that used in conventional transmissive liquid crystal displays.

Various embodiments may find wide applications including active beam bending, head-mounted AR/VR displays, ultrahigh definition displays, multi-view 3D displays and future 2D/3D dynamic holographic displays.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A spatial light modulator comprising:
 a first electrode arrangement;
 a second electrode arrangement;
 a liquid crystal layer between the first electrode arrangement and the second electrode arrangement; and
 one or more nanoantennas in contact with the liquid crystal layer;
 wherein the first electrode arrangement and the second electrode arrangement are each configured to allow at least a portion of light to pass through, and
 wherein a height of each of the one or more nanoantennas is equal to a thickness of the liquid crystal layer.

2. The spatial light modulator according to claim 1,
 wherein the liquid crystal layer is configured to switch liquid crystal directors between a first state and a second state; and
 wherein the one or more nanoantennas are configured to act as Huygens' sources in at least one state selected from the first state and the second state.

3. The spatial light modulator according to claim 1, wherein a thickness of the liquid crystal layer is smaller than a vacuum wavelength ($\lambda_0$) of the light.

4. The spatial light modulator according to claim 1, wherein the first electrode arrangement and the second electrode arrangement are transparent.

5. The spatial light modulator according to claim 1, wherein the one or more nanoantennas comprise a dielectric material or a semiconductor material.

6. The spatial light modulator according to claim 1, wherein the one or more nanoantennas comprise any one material selected from a group consisting of titanium oxide, silicon, germanium, gallium nitride, gallium phosphide, indium phosphide, gallium arsenide, silicon nitride, and copper oxide.

7. The spatial light modulator according to claim 1, wherein the one or more nanoantennas are each of a shape selected from a cylinder, a cuboid, a cross, a ring, and a c-shape.

8. The spatial light modulator according to claim 1, wherein the spatial light modulator has a plurality of pixels.

9. The spatial light modulator according to claim 1, wherein the first electrode arrangement and the second electrode arrangement comprise a transparent conducting oxide.

10. The spatial light modulator according to claim 1, wherein the first electrode arrangement comprises a single electrode;
wherein the second electrode arrangement comprises a single electrode.

11. The spatial light modulator according to claim 1, wherein the first electrode arrangement comprises a single electrode; and
wherein the second electrode arrangement comprises a plurality of electrodes.

12. The spatial light modulator according to claim 1, wherein the first electrode arrangement comprises a plurality of electrodes; and
wherein the second electrode arrangement comprises a single electrode.

13. The spatial light modulator according to claim 1, wherein the first electrode arrangement is over the second electrode arrangement.

14. The spatial light modulator according to claim 1, further comprising:
a first substrate in contact with the first electrode arrangement; and
a second substrate in contact with the second electrode arrangement.

15. The spatial light modulator according to claim 14, wherein the first substrate and the second substrate each comprises silicon dioxide or soda lime glass.

16. The spatial light modulator according to claim 1,
wherein the liquid crystal layer comprises a plurality of uniaxial anisotropic light crystals;
wherein the plurality of uniaxial anisotropic liquid crystals are each configured to change orientation upon application of different voltages between the first electrode arrangement and the second electrode arrangement.

17. The spatial light modulator according to claim 1, wherein the spatial light modulator is a binary phase-only modulator.

18. The spatial light modulator according to claim 1, wherein the spatial light modulator is an amplitude-only modulator.

19. The spatial light modulator according to claim 1,
wherein the one or more nanoantennas are of a cylindrical shape, and
wherein a diameter of one or more nanoantennas is greater than the height of the one or more nanoantennas.

20. A method of forming a spatial light modulator, the method comprising:
forming a first electrode arrangement;
forming a second electrode arrangement;
forming a liquid crystal layer between the first electrode arrangement and the second electrode arrangement; and
forming one or more nanoantennas in contact with the liquid crystal layer;
wherein the first electrode arrangement and the second electrode arrangement are each configured to allow at least a portion of light to pass through, and
wherein a height of each of the one or more nanoantennas is equal to a thickness of the liquid crystal layer.

* * * * *